(12) United States Patent
Shahghasemi

(10) Patent No.: US 8,812,392 B2
(45) Date of Patent: Aug. 19, 2014

(54) METHOD AND A SYSTEM FOR INTERACTING AND TRADING AMONG USERS OF ONLINE SOCIAL COMMERCIAL NETWORK

(71) Applicant: Bikooch LLC, Vienna, VA (US)

(72) Inventor: Javad Shahghasemi, Vienna, VA (US)

( * ) Notice: Subject to any disclaimer, the term of this patent is extended or adjusted under 35 U.S.C. 154(b) by 0 days.

(21) Appl. No.: 13/730,995

(22) Filed: Dec. 29, 2012

(65) Prior Publication Data
US 2014/0188681 A1 Jul. 3, 2014

(51) Int. Cl.
*G06Q 20/22* (2012.01)
(52) U.S. Cl.
CPC ...................................... *G06Q 20/22* (2013.01)
USPC ............................................................. 705/37
(58) Field of Classification Search
CPC ............................... G06Q 20/00; G06Q 30/00
See application file for complete search history.

(56) References Cited

U.S. PATENT DOCUMENTS

| | | | |
|---|---|---|---|
| 2004/0059705 A1* | 3/2004 | Wittke et al. | 707/1 |
| 2007/0130015 A1* | 6/2007 | Starr et al. | 705/14 |
| 2008/0209514 A1* | 8/2008 | L'Heureux et al. | 726/3 |
| 2009/0216577 A1* | 8/2009 | Killebrew | 705/7 |
| 2010/0114739 A1* | 5/2010 | Johnston | 705/27 |

\* cited by examiner

*Primary Examiner* — Bruce I Ebersman
(74) *Attorney, Agent, or Firm* — Barry Choobin; Patent 360 LLC

(57) ABSTRACT

The embodiments herein generally relates to a method for interacting and trading among users of an online social commercial network. A user registers with a web portal and joins to a preferred group of users with a similar interest. The user completes the profile and adds an asset in the web portal. The asset includes an intellectual asset and a product. The user trades the assets with one or more users from a preferred interest. The asset is transacted in terms of a currency. The currency is stored in an online account. The online account is an online user account for keeping transaction related information. The user provides scores to the traded assets and a trading subscriber within the group. The web portal secures the user information in the web portal.

12 Claims, 4 Drawing Sheets

METHOD AND A SYSTEM FOR INTERACTING AND TRADING AMONG USERS OF ONLINE SOCIAL COMMERCIAL NETWORK

CROSS-REFERENCE TO RELATED APPLICATIONS

The present application claims priority from Provisional Application Ser. No. 61/647,530 filed on May 16, 2012, and Provisional Application Ser. No. 61/581,138, the benefit of the earlier filing dates of which is hereby claimed under 35 U.S.C. sctn. 119 (e) and 37 C.F.R. .sctn. 1.78, and which is further incorporated by reference.

BACKGROUND

1. Technical Field

The embodiments herein generally relate to a social networking system and particularly relates to a system and method for forming a likeminded group of users for interacting and trading within the group. The embodiments herein more particularly relates to a system and method for trading of intellects and assets between likeminded and selective users through a social networking web portal.

2. Description of the Related Art

From the past, humans are known to live together in a group. A person always tries to be socially connected to other person, neighbors, friends, etc for various kinds of needs. The most important need of being social or to meet other people is to acquire information. Many groups or societies have been formed for a particular objective and for accumulating the people of same thinking. The individual members of a specific society help in providing any new or relevant information and thus fulfill the requirement or need of other persons of the same society. The humans have moved from the physical societies/communities to the virtual/online based societies where a person is able to share ones thoughts with the members of the online world.

One of the existing prior arts provides a method of creating a social network. The method adopts a website to which many users join. After joining, a user is allowed to send an invitation for connecting with other users who have joined the social network. The social network provides a notification of the recent activities of the linked users. Thus the social network of the prior art is able to provide a communication between the different users but does not provide a way of joining to a group of users with similar thinking. Also the social network does not provide the trading of thoughts, ideas, drawings, solution etc by sharing them within the likeminded users. Further the prior art fails to provide the user an option of joining to a particular group at the time of registering with the social network website.

Another prior art provides a method to form an online groups of users having particular interests. The users of the groups share the ideas, start discussions and post questions within the group. The other users of the group provide their inputs on the discussions, solution to the question, etc. This prior art neither provides a description of the trading of ideas and solutions between the users of a group nor any trading method using online transactions.

Hence, there is a need for a social commercial networking website to allow a user to register and join a specific group of users based on an interest. Further there is a need for a system and a method for providing an option for trading comments, ideas, plans, questions, data, etc among a desired thinking oriented group and earn money or currency. Furthermore, there is a need for a method and a system to store the earned money/currency in an online account which is exchangeable with respect to the existing currencies of different countries.

The abovementioned shortcomings, disadvantages and problems are addressed herein and which will be understood by reading and studying the following specification.

OBJECTIVES OF THE EMBODIMENTS

The primary object of the embodiments herein is to provide a web portal for a social commercial network to allow a user to join with a specific user thinking oriented group and interact with the users of similar interest.

Another object of the embodiments herein is to provide a system and a method for trading intellectual and products between the users of same interest.

Yet another object of the embodiment herein is to provide a system and a method for observing or following the activities of one or more users of same or different interests.

Yet another object of the embodiment herein is to provide a system and method for providing the ratings or the scores to the assets and the user in the web portal.

Yet another object of the embodiment herein is to provide a system and a method to trade intellectual and products between the users of same interest using currency which is exchanged to any international currency based on user location.

Yet another object of the embodiment herein is to provide a system and a method for assisting the trading and interaction of users of same interest through the computing devices.

These and other objects and advantages of the embodiments herein will become readily apparent from the following detailed description taken in conjunction with the accompanying drawings.

SUMMARY

The various embodiments herein generally relates to a system and a method for interacting and trading among the users of an online social commercial network. According to an embodiment herein, the method comprising the steps of registering a user with a web portal as a subscriber. The user registering process includes enabling a user to directly join to a preferred group of users with a similar interest. The similar interest refers to a specific field of interest. After the registration process, a user profile is displayed to one or more users of similar or different interests. Then the user is allowed to execute actions such as adding the user credentials, uploading the images relating to a profile of the user and adding an asset in the web portal. The asset includes an intellectual asset and a product. The added assets are traded through an online social commercial network. The trading is performed among one or more users of a preferred interest. Further the assets are transacted using a currency. The currency is stored in an online account. The online account is an online user account for keeping transaction related information. Afterwards the scores are provided to the traded assets and a trading subscriber within the group. User information is secured in the web portal after the trading process.

According to one embodiment herein, the currency is converted into any existing international currency. The currency is converted into a local currency through any one of the international banks.

According to one embodiment herein, the currency stored in the online account is evaluated using an existing international currency as a reference currency. The online account is registered with at least one bank account of the user.

According to one embodiment herein, a step of registering the user with the web portal comprises providing a user name, an E-mail ID, a password and a user preferred interest to the web portal. Further a preferred name is provided for an online personal webpage. The online personal page is a user Room. The user is allowed to upgrade the user profile containing more features and facilities. The user Room provides the details of all the recent updates and activities occurring among one or more users of the same interest. The user uses the defined Room name for self introduction in the online social commercial network and in real world. Finally the details entered by the user are verified and a policy agreement of the web portal is accepted.

According to one embodiment herein, the intellectual asset and the product is any one of a thought, a comment, an idea, a drawing, an experience, a ballot question, a questionnaires and a multimedia content. The multimedia content includes the videos, the pictures, the articles, the texts and the news.

According to one embodiment herein, the method for interacting and trading among users of an online social commercial network further comprises creating a new interest, when a preferred interest does not exist in the online social commercial network.

According to one embodiment herein, a step of executing user actions through the user interface comprises inviting the friends to join the social commercial network. An invitation or request is sent to the friends by importing the contacts from a social networking site and the E-mail hosting services. Further a list of one or more users of the similar interests is suggested to the registered user. Furthermore, one or more users from the preferred interest are selected and the updates of the selected one or more users are followed up. The updates comprise the recent activities and a traded asset. Still further one or more users from a preferred interest are managed or controlled based on the updates of the user. The one or more users who follow the updates of the user are an observer. The user is an observed user. A description of a different interest is added to the user profile. One or more users of the different interests are also added. One or more web portal related applications are provided to the registered user.

An online storage space is increased for storing the assets. The online storage space is increased by sending a request to a website owner. The request is any one of a free request, paid request and gift request. The positions of the various web portal related actions are arranged and pinned on a web portal header as desired by the user. The registered user is allowed to interact with one or more users of the web portal. The interaction with one or more users is performed by a chat box. The chat box is located to a right side of the web portal. A friends list is managed. The friends list includes one or more users with the similar interests. The friends list is categorized in to one or more specific groups indicating a specific interest.

According to one embodiment herein, the trading of the asset is performed among one or more users of a similar interest. The trading is performed with one or more users of a different interest. The trading process further comprises earning money by selling the asset to one or more users of the same interest. A preset percentage of an amount for the traded asset is collected from a buyer and a seller to the social commercial network. The buyer and the seller are users from the same interest.

According to one embodiment herein, a step of displaying and exhibiting the user profile to other users comprises creating an avatar. The avatar is an image uploaded or selected by the user. Further a menu list is displayed. The menu list comprises the various menu options. The various menu options include options for displaying a user profile, exhibiting an idea, managing a friend, sending or evoking an asset and trading of assets. Furthermore the information of the registered user is displayed in a homepage of the online social commercial network. The displayed information comprises the information for a last activity, a last shopping, a last evoking (summoning), a last attended and a last shared discussion. Then the user name and a score along with a list of user interested activities are displayed.

According to one embodiment herein, a scoring is assigned or provided to the user and the asset through a scoring mechanism thereby allowing a trading of good quality asset. The scoring mechanism comprises assigning a score comprising a series of letters and the series of letters is "WOOOOOW". Each letter of the string "WOOOOOW" is represented by a rainbow color starting from a light blue and ending with a dark blue. Each letter of the string "WOOOOOW" corresponds to a score. Only a single letter corresponds to a minimum score. a series of stars are used to provide the scores and wherein the stars are five in number, and wherein the user gives a preferred number of stars ranging from one to five for an asset posted by one or more registered users of the online social commercial network; and a warning message is sent to the user with a minimum score. Further a score is provided for all the assets and the users of the online social commercial network. The user provides a comment on the asset based on a liking.

According to one embodiment herein, a step of securing the user information comprises determining a part of the user profile which is to be displayed to one or more users. The user blocking from taking part in a discussion and trading an asset based on a result of an inappropriate conduct of the user.

According to one embodiment herein, the user performs the trading of the asset through a data shop. The data shop is a place or space of the web portal for allowing the user for to trade the asset effectively. The data shop is provided for sharing and trading the asset among the users of same interest and different interest. The data shop provides a list of most recent shared assets from one or more users of the same interest, the friends of the one or more users of the same interest and the one or more users of different interests. The most recent asset is shared by the Observer. The user is able to see the type of asset, score of the asset and a name of the sharing Observer. The data shop is provided for searching a desired asset. The desired asset is shared by one or more users of same and different interests. The search is conducted based on a type of asset, a subject of the asset, a price of the asset and a score of the asset. The data shop is provided for sending the asset to one or more users of the preferred interest. The asset is sent after providing the details of the asset. The details of the asset comprise a brief description of the asset, a sample of the asset, a price of the asset and an interest of the asset. The data shop is provided for facilitating a discussion within the users of similar interests. The discussion includes a questionnaire and a poll. The discussion is initiated by sending an invitation to one or more users of the same interest. The user provides or assigns the scores to the one or more participating users for the response. The data shop is provided for receiving a response for the asset. The response includes an answer, a suggestion, and a request to sell and request to buy. The data shop provides a statistical analysis of the traded assets.

According to one embodiment herein, the statistical analysis of the traded asset comprises a score to the traded asset, a score to the user and a pictorial chart for the traded asset. The scores are provided by one or more users within a similar interest. The scores are provided to the user based on the quality of the traded asset. The pictorial chart includes a scoring, a liking and a disliking of the traded asset.

According to one embodiment herein, the user performs the trading of the asset through a rent mind section, and wherein the rent mind is a part of the web portal providing advertisements based service of assets between plurality of users of a interest, and wherein the user earns money by renting the rent mind for keeping an advertisement provided from an advertiser, and wherein the user views and responds to the advertisement posted by a second user in the same interest and earns money, and wherein the user creates an advertisement with details comprising an advertisement title, advertisement description, a question, an option for answers, a right option, a cover image, a preferred interest, a reward, a responder's score, a time, a date, a category of responders, and wherein the created advertisement is released in the same interests and is automatically listed in a most recent advertisement list, and wherein the user is provided with two options for managing the advertisement, and wherein a first option provides a control to the user for managing the created advertisement details comprising number of responders, balance, advertisement releasing date and the like, and wherein a second option provides the user to review any previously answered question, and wherein a searching system is used for searching a specific advertisement according to the specific interest, and wherein the searching system provides an advance search which enables the user to find a specific advertisement in a specific time, by a specific reward.

According to one embodiment herein, the method for interacting and trading assets among the users of an online social commercial network further comprises employing the users selected from a team of best users for executing a task for a period. The users selected from the team of best users are employed temporarily or permanently.

According to one embodiment herein, the team of best users has a score more than a preset threshold score value. The team of the best users is formed automatically by the web portal.

The various embodiments herein provide a system for interacting and trading assets among users of an online social commercial network provided with a Rich Internet Application (RIA). According to an embodiment herein, the system comprises an Offline Storage engine. The Offline Storage engine stores the required data on a user computing device and browser without affecting a security. The user computing device is any one of a computer, laptop, tablet and a smart phone with internet connectivity. Further a Synchronize Cache engine is provided to allow the user to access social commercial network content without connecting to the internet. Furthermore an Orientation Sensor engine is provided to enable the user to determine a password through a hardware navigation of the user computing device. Still further a User Notification system is provided to exhibit an advanced display in the chat box. The advanced display is provided after connecting an application installed in the computing device, the social commercial network web portal and the operating system of the computing device. Still further, a File System Access controller is provided to allow the user to upload the asset files to the web portal. Still further, a Drag and Drop engine is provided to allow the user to download the asset by just dragging the asset from the web portal to a front screen of the computing device. The user uploads the asset by just dragging the asset from the computing device to the web portal. Still further, a User Locating engine is provided to detect an exact geographical location of the user and to direct the user to a nearest server or software localization. Still further a Simultaneous Server Content system is provided to allow the user to connect with the servers without any difficulty through a web socket technique. The web socket is a technique for connecting to the server through a Transfer Control Protocol (TCP) socket which is capsulated in an HTTP protocol. Still further, a Sound Processing Command system is mounted to receive a voice input of the user to perform the user actions in the web portal. Still further, a Semantic Structure system is provided to create the web pages of the web portal to be analyzed by the search engines. Still further, a Video Chat component is provided to allow the user to chat with one or more users at a time. Lastly, a Cloud Server is provided to store all the information of the user. The information is provided at anytime upon a request by the user to the cloud Server.

According to one embodiment herein, the User Locating engine further comprises a Content Delivery Network (CDN). The Content Delivery Network provides information based on the geographical location of the user.

According to one embodiment herein, the User Locating engine directs the user towards the contents that is shared by the user with the content owners on a geographical location based on a sharing basis. The User Locating engine limits or changes the application content for a specific geographical area. The User Locating engine directs the user to the friends of same interest. The friends are located in a particular geographical area.

According to an embodiment herein, Bikooch is a commercial network with social embedded capabilities aiming to provide an environment for the users to earn money through the various applications and take up Bikooch as their career.

According to an embodiment herein, every user has a Room Name on Bikooch and the Room Name is defined after the activity of the user does reaches a preset score level. Every individual has a specific Room Name and the Room Name is used for introducing him/herself in Bikooch and real world. The Room Name is defined exclusively for each user. For example: www.bikooch.com/RoomName According to an embodiment herein, every user's room name is the same as the user's website domain. When the user is allowed to have a room name, and the user is an owner of a website, the domain name of the website is chosen as the room name. Then the user is asked to introduce an email address with the website domain name and receive the activation link in that email address. This feature prevents from others abusing the website domain names. When the user does not have a website, then the user is allowed to choose another room name.

According to an embodiment herein, Bikooch users are able to sell their data including image, sound, video, text and etc. or earn money through "Rent Mind" page and answering their desired Advertisements.

According to an embodiment herein, the users are able to transfer money from their bank account into their Bikooch account through online payment gateways such as PayPal or using Visa/Master cards and start the financial transactions on Bikooch. There is also this capability to use Bikooch freely and earn money through "Data Shop" and "Rent Minds". This feature is elaborated in the following sections.

According to an embodiment herein, the sections such as DataShop, Rent Minds, Questions and Answers and other parts of Bikooch have a scoring system which works with stars. Users can give score to other's contents by 1 to 5 stars. These scores affect directly each user's status diagram and causes to improve the user's credit on the website.

According to an embodiment herein, every user has a field of own interests. There is some space allocated to each user to upload one's files or Rent minds. This space is managed by a File Management system. The user is able to buy more space from the website if needed.

According to an embodiment herein, the fields of interests are those fields that users like, work on or would like to work on them. The users are allowed to define the fields of interests and find other people who have same interests as them (their same-interest friends) and interact with them. When a user's field of interest does not exist on Bikooch, the user is able to create it and invite other users to that field of interest. The user-created fields of interests are not exclusive and other users are allowed to choose the field of interests as the field of interests and are allowed to actively participate in the chosen or created field of interests.

According to an embodiment herein, each field of interest has its own page containing all information about that field of interest which makes an access easier for the users. This page includes the recently joined users to the fields of interest, the recent data available in the field of interest, the recent rent minds available in the field of interest, the best and most-selling data of the field of interest, suggesting related field of interests to the chosen field of interest and the suggestions which are offered in this page and related to the field of interest.

According to an embodiment herein, the users are allowed to go to an account setting and hide some fields of interests when the users don't want them to be visible to the public.

According to an embodiment herein, the people or a first time user is allowed to go to the Bikooch first page and use the sign up section and register on Bikooch or use their Facebook or twitter account for their registration. The users are asked to provide their personal information including name, family name, a valid email and a secure password. The users must register with their real name and family name. In order to send the user's revenue earned from Bikooch, a cheque is sent to the address provided by user and only the profile owner is allowed to receive the cheque by presenting a valid ID card and encash the cheque.

After completing the first step of registration, the user is directed to the next step in which the user is allowed to choose the desired field of interests or create the desired field of interests when the desired field of interests do not exist in Bikooch database. The user is able to produce data and distribute them in the related field of interest and share with the friends having the desired field of interests. Also the user is able to rent others' mind for ones advertisements or offer one's mind to others for their advertisements.

In the next step, the registration is completed and user enters the website. In this step, the user is able to see the people who are in ones selected fields of interests and "Observe" them if interested. In this page, the user is also able to invite ones friends to Bikooch using different email services. When ones friends are Bikooch members, the user is notified to "Observe" them.

According to an embodiment herein, every Bikooch user has an account like a bank account. The users are able to transfer money from their bank account to their Bikooch account through PayPal and using Visa, Master, Egold and etc. and buy data or create Advertisements in "Rent Minds" page. The currency is US dollar or the equivalent. This part includes adding money to the account, a money transfer process, and a money withdrawal process.

According to an embodiment herein, the users are able to add money to the account. The Bikooch users are able to feed the account using a direct way (transfer money from their bank account) or buy the charge packages offered by Bikooch. These packages have some extra value more than their price to encourage the users to deposit more money into their account (e.g. user buy the package for $90 but $100 will be added to his/her account. In order to directly add money to their Bikooch account, the users are allowed to use an online payment gateway to transfer money from their bank account to their Bikooch account.

According to an embodiment herein, the Bikooch users are able to transfer the money from their Bikooch account to their friends' account. This transferring is limited to prevent the hackers' abusive actions or other security-threatening actions and users are not allowed to transfer all of their money at once.

According to an embodiment herein, in order to withdraw money from the Bikooch account, every user on Bikooch is asked to provide ones real name, surname, valid email address and postal address. To receive the cheque from Bikooch these details are required. When the users request for a withdrawal of their money, the Bikooch issue a cheque in the name of profile holder. This prevents any abuses or thefts and improves security. For requesting a money withdrawal, the user has to select Finance, and withdrawal options and determine the amount and send the request to Bikooch. After investigating some issues such as user's financial activities, any possible claims, copyright infringement and etc. the Bikooch sends a cheque to the user's address.

According to an embodiment herein, the user's status shows ones score and amount of activities in the different fields of interests. These scores are defined by stars ranging from 1 to 5 stars.

According to an embodiment herein, different criteria are considered to form the user's status. The status of the users includes the scores of created data by a user, the scores of activities in the Rent mind, a spending time on different parts of the website (staying on the website), a sharing and other activities, a buying of others' data, a marketing of the data, a responding to the Advertisements, being active in "Questions and Answers" section, attending and activity in "Request" section and total numbers of logging in and using the website. These criteria influence total scores and accordingly the user's status which is useful for the user in gaining money in the different fields of interests.

According to an embodiment herein, to view a user's status go to ones or his/her profile and use the status tab. The status indicates in which field of interests the user is more active and more professional. This part is also used to find the proper persons for team works, Rent mind for advertising, request and active users in different fields of interests. This part is more advantageous for those who seek for commercial and professional activities.

According to an embodiment herein, a Mind renting is one of the best and most powerful parts of Bikooch. The users are able to use this part to earn money and get familiar with the new products and contents in their field of interests.

Outdoor advertisements (billboards), TV commercials and etc. make people to watch them involuntarily. People watch them although they are irrelevant to their interests. Sometimes these Advertisements leave an unfavorable effect on their viewers' mind. But in Bikooch—"Rent Minds", the users rent their mind and get paid for keeping the Advertisement content in their mind. Further, the users watch and respond to the Advertisements which are consistent with their fields of interests. The user responds to them according to his/her interest or profession. This kind of advertising penetrates deeply into the user's mind and stays there longer. Additionally this type of advertising is totally targeted and the companies who seek for the most influential way of advertising find this as the best mode of advertising and replace their outdoor, TV, newspaper/magazines advertisements with the Bikooch users' mind and the users share the information with their friends.

When the users go to this part, they are able to see the most recent Advertisements released in their fields of interests and earn money by responding to those Advertisements. Thus the users and the companies rent the users' minds and leave their advertisements on them in any fields of interests relates to the Advertisement.

After going to the section for creating an Advertisement and renting a mind, the user has to provide some information in two steps. The information provided in the first step includes an Advertisement title, an Advertisement description (including text or link), a Question (in check-box form and no limitation in number of questions), an Answer options (4 options or more) and the right option.

The information provided in the second step includes a cover image, a related fields of interests, a reward amount paid to the responder (it also can be free), responder's score (in this part one can determine the score of responders, for example, 2 stars and more), Deadline date, rewarding total true answers (for example, user decides that reward goes to one who answers 4 out of 5 questions correctly), times of answering (if users answer the questions incorrectly they can try to answer as many times as creator allows and this causes the Advertisement sticks longer in the minds of the users), gender of responders, range of age of responders and country of responders. Normally, in this part high-scoring users are chosen and this leads the users to be more active to get more scores and be invited to answer Advertisements and gain money.

According to one embodiment herein, a puzzled picture section of the Rent Minds is used for advertising. For Advertisements to stay longer in the minds of the users, the companies chooses a puzzled picture and send their logos or other advertising images as puzzled picture to their targeted users. In this way, those users or the companies who want to advertise their products or services are able to make the puzzle pictures of anything they want to be advertised and send them in related interests. The users who receive the puzzle pictures win the reward by completing the picture and send it back to the creator.

To create puzzle advertisements, after going to Rent Minds, the user chooses a puzzle advertisement and uploads the picture from his/her computer. In the next step, the user selects a puzzling pattern which is either a 20-piece or 30-piece puzzle pattern. There are pluralities of puzzle patterns available. After selecting a desired puzzle pattern, the user should provide some information. The procedure of sending a puzzle advertisement comprises a first step and a second step. The first step requires providing a title, uploading a picture and choosing the puzzle pattern.

The second step comprises, providing a cover image, interests, reward (also given as free), Responding duration (creator determines a duration for completing the puzzle), Responder's score (in this part one the score of responders is determined, for example, 2 stars and more), Deadline date, Gender of responders, Age range of responders and Country of responders. In the second step, high-score users are chosen and this leads the users to be more active to get more scores and be invited to answer Advertisements and gain money.

Advertisements remain till their deadline date and after that they are removed from the list. An Advertisement creator is able to consider or count an amount for the advertisement and release it again. This causes stir among users to try harder to answer to the Advertisements.

After releasing, advertisement is placed in the most recent advertisements list in that field of interest. The Users are allowed to answer the questions or in other words rent their minds to memorize the information and get paid in turn.

There are two parts to manage advertisements. They are created Advertisements and Answered Advertisements. In the Created Advertisements, the users are allowed to have control on their created Advertisements and review the information such as number of responders, balance, releasing date and etc. in order to create more targeted advertisements and get better outcome.

In the Answered Advertisement section, the users are allowed to review the Advertisements that they answered before. If they have provided incorrect answers, they are allowed to correct the answers after deadline date. This helps the users to add to their knowledge about a specific issue and do better in next Advertisements.

Each Advertisement has its own page and the users are able to reach it by clicking on the Advertisement. This page includes a reward, the field of interests and the maximum responders. A commenting option is allowed only for those who answered the Advertisement.

According to an embodiment, a searching system is provided for advertisements in order to enable the users to find the better advertisements in their field of interests and answer them according to their score (stars). The users are able to find a specific Advertisement in a specific time and by a specific reward using the advance search.

According to an embodiment herein, a Data Shop is provided. Like Rent Minds, Data Shop is also one of the best parts of Bikooch for earning money by the users. In this part, the users share their data including images, videos, zip file, text file and etc. with their friends having the same fields of interest and determine a price for their files and earn money by selling them. The released data in user's fields of interests are viewed through "released data" and other users are able to find their desired data through the list and buy them if interested. Every user is allowed to create, buy, market and search a data.

According to an embodiment herein, in the process of Creating Data, the users are able to create their data and release in the proper fields of interests and sell them with their determined price. In this part the user finds a Data title, a Data description, a Cover image, a Data uploading, fields of Interests (in which data is released for the creator's observers), Data price (freely or costly). If data is distributed freely, the creator is able to explain his/her reason to do so. If data is shared costly, Bikooch recommend some prices to user which helps user to price data properly. The user further finds a marketing percentage (if a person is interested in marketing a data, this part shows his/her percentage from each selling). After buying a data, the users are allowed to provide scores or leave their comments on the data. These scores are important for the users' status and improve their scores in that field of interest.

In order to buy a data, the user has to click on the data or its cover image and be directed to the data page. Then the users are allowed to see details information, scores, and comments of that data and buy it if they want. The data page includes information like Data title, Data description, Data price, fields of Interests, Comments, Scores and Total purchase.

By clicking on "Buy" option, the user is directed to a page in which the final agreements for buying data and deducting its price from the user's account are provided. After buying, the user is able to download the data.

By marketing the data in the Data Shop, the users help selling data and gain their percentage from selling it. This is another way to earn money. This feature is useful for not infringing copyright law and earning money by those who are professional in marketing.

For marketing a data, the user clicks on the option—"Marketing" and is able to see some information about the marketing percentage and additional information. The user is able to make more money through every selling.

A Search Data process helps the user to find a specific data. By providing title, type (image, video, text and etc.), field of interest and price of the data, the users are able to find easily their desired data and buy it.

According to an embodiment herein, a Friend management section is provided in the data shop. The relationships between Bikooch users are either one-way or two-way. Every user is able to observe another user or be observed by other user. Generally friends in Bikooch consist of 2 groups: Observer and Observed.

In Friend Management section, the users are able to classify the different categories of their friends to simplify a sharing process. These categories are differentiated by different colors. This setting is done by the user. The user provides or chooses a color for each of friend categories and moves his/her friends in them. For example red for family, yellow for friends and etc.

In the Suggestions section, Bikooch users have various interests and simultaneously a really big load of data is shared between different fields of interests. The User definitely misses some of them or is unable to find specific people on Bikooch. To simplify data and person finding process for the users, Bikooch has a Suggestion Page in which all the Bikooch suggestions are classified and users are able to easily find what they look for such as Data, Rent Minds, People, Close fields of interests, Questions and answers, Request and Discussion In the Message and Chat services section, easy connection is provided among users and the Bikooch provides Message and Chat services. Chat service is available only between the users who are in relation with each other (whether observe or observed). An icon for messaging is embedded in the users profile to improve its accessibility.

In the Profile section in Bikooch, every user has his/her own profile containing the general and professional information. The User is able to control this information and their displaying through Account Setting. The Room Name presents user's profile and by clicking on it, one is allowed to access the user's profile. The information provided in the profile includes Recent updates (updates in sharing and other things), User's information, Status, fields of Interests, Friends, Observers, Avatar and cover image.

According to an embodiment herein, the User's Information includes General information, Contact details, Professional (work) information and other profiles in other social networks.

According to an embodiment herein, the Sharing section is default in the first page after logging in and provided in user's profile to provide the capability of sharing content among friends and observers. Recent updates of every user's activities such as data creating, Rent minds, responding to answers, buying data and etc. are shared automatically with user's friends to notify them.

The Users are able to use the sharing section to introduce their data, advertisements, etc and share them with friends or observers. The sharing section is used to share Texts, Images, Videos and Links.

According to an embodiment herein, the Bikooch users are able to synchronize their Bikooch profile with their profiles in other social networks such as Facebook, twitter and etc. to share their recent events in all profiles and their friends in other social networks be notified of recent user's earning money. The Synchronizing enable the users to use other social networks to log in their Bikooch accounts.

According to an embodiment herein, the Websites owners and weblog administrators who like to share their content on Bikooch are allowed to do so by using Bikooch bookmarks. Bikooch bookmarks are some icons in different sizes which are given to the users and are can placed in their sites.

According to an embodiment herein, Mobile web and Applications are provided in Bikooch capabilities to enable one to refer to mobile web and applications for different operating systems which simplify the using of Bikooch. Those who connect Bikooch through their mobile phone use the mobile web capability which loads pages faster and smoother in the application environment.

According to an embodiment herein, a File Manager is provided to enable the Bikooch users to manage their uploaded files and delete or edit cover images, avatar, data shop files, advertisements etc. and control them. Every Bikooch user has a certain space to upload his/her files and when needed he/she can buy more space from the website and manage it through file manager.

According to an embodiment herein, Questions & Answers section is provided to enable the users to ask their questions about different fields of interests from the professional users in those fields of interests to get the best answers. In order to use this capability, the users are allowed to ask their questions in the related fields of interests and the other users in that field of interest answers the question. This process is costly and user who asks a question is able to fix or determine an amount to be given to the responders. This causes getting answers faster and better. Then the user selects the best answer and pays the amount to the responder. This section includes sub sections, which are not limited to Recent questions, Ask a question, Search for questions, My asked questions and Best questions.

According to an embodiment herein, the Recent questions part is provided in "question & Answers" page and the users are able to see the recent questions asked in their fields of interests and answer them if interested. Scoring and commenting is only available to those users who answer the questions.

According to an embodiment herein, the Ask a question section is provided to enable the user to provide some information about the question including but not limited to Title, Description, fields of Interests, Award to the best answer, Share the question according to the status and stars, and other advance setting to receive the best answer fast According to an embodiment herein, the best questions are displayed in the user's panel and based on question's score. It enables the user to see the questions with the highest-score in his/her interests which helps the user to get more information in the fields of his/her interest.

According to an embodiment herein, My Asked questions section is provided to enable the users to manage their asked questions and review the answers and scores. And then user has to choose the best answer and give the award to the responder. Scores and best answers influence the status.

According to an embodiment herein, a Shopping page is provided to offer a window to shopping websites like eBay, Amazon and etc. through Bikooch. It suggests the users with some products according to their fields of interests. Shopping websites categorize these products and user can buy them through his/her Bikooch account. When buying a product, user's friends who have information about that fields of interest/product are suggested to the user in order to do the best shopping.

In other words Bikooch is a mediator between the users and shopping websites. The Users are able to search or find and buy their desired products easily. By this, they are able to save their earnings from Bikooch and spend them on buying their needed products from shopping websites.

According to an embodiment herein, the users are allowed to form and build a Teamwork. The Bikooch users who work in the field of same specialty are allowed to make a group and act under a room name (profile). All the group members coordinate and make a data, advertisement, question and etc. and share it under their unique room name.

The Users who reach to a high level score can be the group admin and form a group under a room name and use each other's knowledge and experience to improve their credit on Bikooch. The Admin determines every member's percentage of the group revenue by answering Advertisements, buying and selling data and etc. and the scores and payments are also divided according to that percentage.

Teamwork is useful for those companies seeking for professional people in various fields. Teamwork also has status. One is able to see their status in their profile and compare different status to learn more about each one's activity.

According to an embodiment herein, a request page is provided to enable the companies to seek or search for professional users or teamworks, who are able to help them in their required fields, and choose a group of users according to their status and send them requests. Requests are sent to high-score users and they get paid by request sender per answer they sent.

According to an embodiment herein, in order to expand Bikooch among people, Bikooch invites second best and third best people in specific fields of interests to join Bikooch and provokes them to create data and be active. for example, in music field, second best and third best artists are invited to Bikooch and after joining they create data including songs, clips, and tutorial videos and send to their fans. In addition to earning money for that artist, it improves Bikooch credit. After a while and earning money by these artists, the best artists join Bikooch too. These people tell their fans about their profile in Bikooch so their fans join Bikooch too and help selling their data and expanding Bikooch. Thus, a network of people who are Bikooch users are created. So the Advertisement agencies are convinced to advertise their products in their related fields of interests and earn lots of money in Rent Minds. Earning money by these people leads to more revenue for Bikooch and advertise it among people. Finally people recommend it to others and this leads to a rapid expansion of Bikooch.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
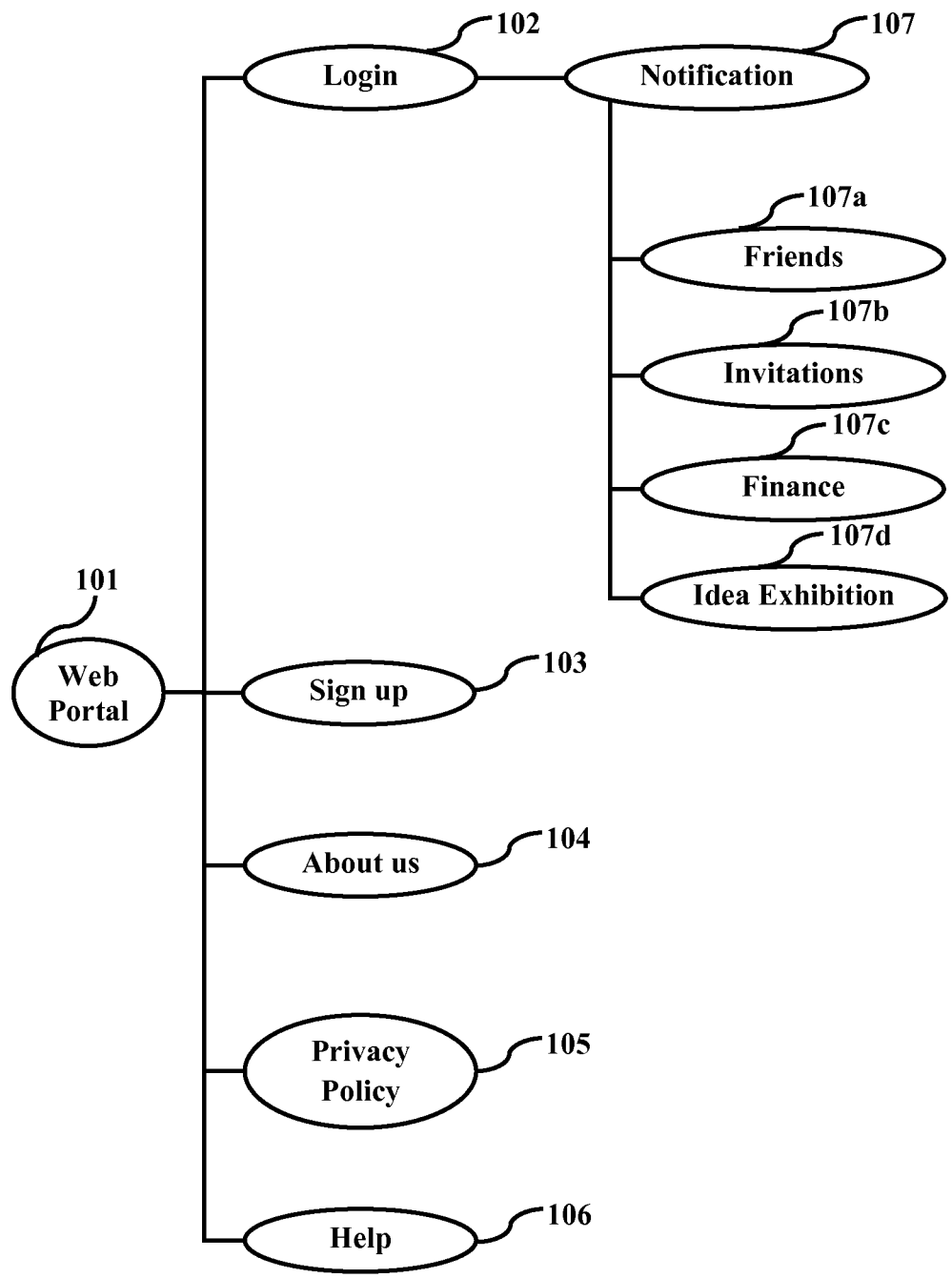
FIG. 1 illustrates a functional block diagram of a web portal of a social commercial network for interacting and trading assets among users, according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein generally relates to a system and a method for interacting and trading among the users of an online social commercial network. According to an embodiment herein, the method comprising the steps of registering a user with a web portal as a subscriber. The user registering process includes enabling a user to directly join to a preferred group of users with a similar interest. The similar interest refers to a specific field of interest. After the registration process, a user profile is displayed to one or more users of similar or different interests. Then the user is allowed to execute actions such as adding the user credentials, uploading the images relating to a profile of the user and adding an asset in the web portal. The asset includes an intellectual asset and a product. The added assets are traded through an online social commercial network. The trading is performed among one or more users of a preferred interest. Further the assets are transacted using a currency. The currency is stored in an online account. The online account is an online user account for keeping the transaction related information. Afterwards the scores are provided to the traded assets and a trading subscriber within the group. User information is secured in the web portal after the trading process.

According to one embodiment herein, the currency is converted into any existing international currency. The currency is converted into a local currency through any one of the international banks.

According to one embodiment herein, the currency stored in the online account is evaluated using an existing international currency as a reference currency. The online account is registered with at least one bank account of the user.

According to one embodiment herein, a step of registering the user with the web portal comprises providing a user name, an E-mail ID, a password and a user preferred interest to the web portal. Further a preferred name is provided for an online personal webpage. The online personal page is a user Room. The user is allowed to upgrade the user profile containing more features and facilities. The user Room provides the details of all the recent updates and activities occurring among one or more users of the same interest. Finally the details entered by the user are verified and a policy agreement of the web portal is accepted.

According to one embodiment herein, the intellectual asset and the product is any one of a thought, a comment, an idea, a drawing, an experience, a ballot question, a questionnaires and a multimedia content. The multimedia content includes the videos, the pictures, the articles, the texts and the news.

According to one embodiment herein, the method for interacting and trading among users of an online social commercial network further comprises creating a new interest, when a preferred interest does not exist in the online social commercial network.

According to one embodiment herein, a step of executing user actions through the user interface comprises inviting the friends to join the social commercial network. An invitation or request is sent to the friends by importing the contacts from a social networking site and the E-mail hosting services. Further a list of one or more users of the similar interests is suggested to the registered user. Furthermore, one or more users from the preferred interest are selected and the updates of the selected one or more users are followed up. The updates comprise the recent activities and a traded asset. Still further one or more users from a preferred interest are managed or controlled based on the updates of the user. The one or more users who follow the updates of the user are an observer. The user is an observed user. A description of a different interest is added to the user profile. One or more users of the different interests are also added. One or more web portal related applications are provided to the registered user.

An online storage space is created and increased for storing the assets. The online storage space is increased by sending a request to a website owner. The request is any one of a free request, paid request and gift request. The positions of the various web portal related actions are arranged and pinned on a web portal header as desired by the user. The registered user is allowed to interact with one or more users of the web portal. The interaction with one or more users is performed by a chat box. The chat box is located to a right side of the web portal. A friends list is managed. The friends list includes one or more users with the similar interests. The friends list is categorized into one or more specific groups indicating a specific interest.

According to one embodiment herein, the trading of the asset is performed among one or more users of a similar interests. The trading is performed with one or more users of a different interest. The trading process further comprises earning money by selling the asset to one or more users of the same interest. A preset percentage of an amount for the traded asset is collected from a buyer and a seller to the social commercial network. The buyer and the seller are users from the same interest.

According to one embodiment herein, a step of displaying and exhibiting the user profile to other users comprises creating an avatar. The avatar is an image uploaded or selected by the user. Further a menu list is displayed. The menu list comprises the various menu options. The various menu options include options for displaying a user profile, exhibiting an idea, managing a friend, sending or evoking an asset and trading of assets. Furthermore the information of the registered user is displayed in a homepage of the online social commercial network. The displayed information comprises the information for a last activity, a last shopping, a last evoking (summoning), a last attended and a last shared discussion. Then the user name and a score along with a list of user interested activities are displayed.

According to one embodiment herein, a scoring is assigned or provided to the user and the asset through a scoring mechanism thereby allowing a trading of good quality asset. The scoring mechanism comprises assigning a score comprising a series of letters and the series of letters is "WOOOOOW". Each letter of the string "WOOOOOW" is represented by a rainbow color starting from a light blue and ending with a dark blue. Each letter of the string "WOOOOOW" corresponds to a score. Only a single letter corresponds to a minimum score. A warning message is sent to the user with a minimum score. Further a score is provided for all the assets and the users of the online social commercial network. The user provides a comment on the asset based on a liking.

According to one embodiment herein, a step of securing the user information comprises determining a part of the user profile which is to be displayed to one or more users. The user blocking from taking part in a discussion and trading an asset based on a result of an inappropriate conduct of the user.

According to one embodiment herein, the user performs the trading of the asset through a data shop. The data shop is a place or space of the web portal for allowing the user to trade the asset effectively. The data shop is provided for sharing and trading the asset among the users of same interest and different interests. The data shop provides a list of most recent shared assets from one or more users of the same interest, the friends of the one or more users of the same interest and the one or more users of different interests. The most recent asset is shared by the Observer. The user is able to see the type of asset, score of the asset and a name of the sharing Observer. The data shop is provided for searching a desired asset. The desired asset is shared by one or more users of same and different interests. The search is conducted based on a type of asset, a subject of the asset, a price of the asset and a score of the asset. The data shop is provided for sending the asset to one or more users of the preferred interest. The asset is sent after providing the details of the asset. The details of the asset comprise a brief description of the asset, a sample of the asset, a price of the asset and an interest of the asset. The data shop is provided for facilitating a discussion within the users of similar interests. The discussion includes a questionnaire and a poll. The discussion is initiated by sending an invitation to one or more users of the same interest. The user provides or assigns the scores to the one or more participating users for the response. The data shop is provided for receiving a response for the asset. The response includes an answer, a suggestion, and a request to sell and request to buy. The data shop provides a statistical analysis of the traded assets.

According to one embodiment herein, the statistical analysis of the traded asset comprises a score to the traded asset, a score to the user and a pictorial chart for the traded asset. The scores are provided by one or more users within a similar interest. The scores are provided to the user based on the quality of the traded asset. The pictorial chart includes a scoring, a liking and a disliking of the traded asset.

According to one embodiment herein, the method for interacting and trading assets among the users of an online social commercial network further comprises employing the users selected from a team of the best users for executing a task for a time period. The users selected from the team of the best users are employed temporarily or permanently.

According to one embodiment herein, the team of best users has a score more than a preset threshold score value. The team of the best users is formed automatically by the web portal.

The various embodiments herein provide a system for interacting and trading the assets among the users of an online social commercial network provided with a rich Internet application (RIA). According to an embodiment herein, the system comprises an Offline Storage engine. The Offline Storage engine stores the required data on a user computing device and browser without affecting a security. The user computing device is any one of a computer, laptop, tablet and a smart phone with internet connectivity. Further a Synchronize Cache engine is provided to allow the user to access a social commercial network content without connecting to the Internet. Furthermore an Orientation Sensor engine is provided to enable the user to determine a password through a hardware navigation of the user computing device. Still further a User Notification system is provided to exhibit an advanced display in the chat box. The advanced display is provided after connecting an application installed in the computing device, the social commercial network web portal and the operating system of the computing device. Still further, a File System Access controller is provided to allow the user to upload the asset files to the web portal. Still further, a Drag and Drop engine is provided to allow the user to download the asset by just dragging the asset from the web portal to a front screen of the computing device. The user uploads the asset by just dragging the asset from the computing device to the web portal. Still further, a User Locating engine is provided to detect an exact geographical location of the user and to direct the user to a nearest server or software localization. Still further a Simultaneous Server Content system is provided to allow the user to connect with the servers without any difficulty through a web socket technique. The web socket is a technique for connecting to the server through a Transfer Control Protocol (TCP) socket which is capsulated in an HTTP protocol. Still further, a Sound Processing Command system is mounted to receive a voice input of the user to perform the user actions in the web portal. Still further, a Semantic Structure system is provided to create the web pages of the web portal to be analyzed by the search engines. Still further, a Video Chat component is provided to allow the user to chat with one or more users at a time. Lastly, a Cloud Server is provided to store all the information of the user. The information is provided at anytime upon a request by the user to the cloud Server.

According to one embodiment herein, the User Locating engine further comprises a Content Delivery Network (CDN). The Content Delivery Network provides information based on the geographical location of the user.

According to one embodiment herein, the User Locating engine directs the user towards the contents that is shared by the user with the content owners on a geographical location based on a sharing basis. The User Locating engine limits or changes the application content for a specific geographical area. The User Locating engine directs the user to the friends of same interest. The friends are located in a particular geographical area.

FIG. 1 illustrates a structure of a web portal of a social commercial network between pluralities of users, according to one embodiment herein. A user opens the web portal 101 in a browser through a computing device. The computing device is any one of a Smartphone, computer, laptop, tablet, handheld device etc. The web portal 101 loads in the computing device and opens the Main/Entrance Page. The Entrance Page of the web portal 101 displays a predefined title along with the five headers at the predetermined locations. The Entrance Page is upgradable to have more than five headers. The headers are certain functions provided in a definite form through which the user is able to access the web portal. The five headers are Login 102, Sign up 103, About us 104, Privacy policy 105, Help 106. The Login header 102 is located at a top right section of the web portal and the Login header 102 allows the user to login to the social commercial network. The user logs in the web portal after a successful registration. A "Password remembrance" option is adopted next to Login header 102. The "Password remembrance" helps a registered user in reminding a forgotten password. Once the user is logged in, the user is allowed to view the notification for all activities of self and as well as selected members based on an interest. The Notification Header 107 provides notifications for any updates related to Friends 107a, Invitations 107b, Finance 107c, Idea Exhibition 107d, etc. The notification for friends includes a Friend request, updates on friend's activity, etc. The notification for Invitations 107b includes discussions, poll etc. The notification for Finance 107c includes sharing of virtual money etc. The notification for Idea Exhibition 107d includes sharing of intellectual asset etc. The Sign up 103 header is preferably located at the center or at a left of the Entrance Page. The user selects Sign up header 103 for registering with the social commercial network web portal. The Sign up header 103 allows the user to register with the web portal and provides trading and communication features based on interest. The About us header 104 provides the details of the web portal along with a brief history, team details etc. The Privacy Policy header 105 provides all the terms, rules and regulation about the website. The Help header 106 provides assistance to the user who is new to the web portal or who is finding difficulty or seeking information on using the web portal. The Help header 106 also provides a "Frequently Asked questions" (FAQ) and related answers to the user.

With respect to FIG. 1, the Sign up 103 header provides a five-step registration process. The user is directed to the first step of registration on clicking the Sign up header 103. The first step in the registration process comprises providing user credentials like a user name, a surname/family name, an E-mail ID, a password, etc. The user name signifies the first and middle name (if any) of the user. The surname signifies the last name of the user. The E-mail ID signifies a registered E-mail ID through which the user desires to be contacted by the web portal. The password is provided to enable a secure login to the web portal. The web portal also enables the user to use an already existing account detail of any one of a social networking websites such as Facebook®, Twitter®, etc for easy registration.

The Second step of a registration process is selecting a name for a Room. The Room indicates a personal online web page for the user and the recent updates of the activities of the user and friends are displayed at the Room. At this step, the user chooses a name for the Room. The name is permanent and hence it is to be selected cautiously. A Domain or website name is to be registered by the owner of the website only. When the user selects or provides a desired Room name, the web portal initiates the searching process to find out the domains existing with the same name on the database of the web portal. The search result is displayed below a blank field. The blank field is the space where the user enters the name of the Room. If the Room name is unregistered, the user registers the entered name with the portal. The user picks another name for the Room if the user is not the owner of the domain. The room name for the Domains in the websites are displayed with "Who is" and "Who are" indications, which are reserved in default manner on the web portal. The website/domain owner picks the Room name just by clicking on that domain. So the Room name for a domain is identified with the website name, i.e. if the registering user is the owner of one of the displayed domains, the user enters directly to Website domain by choosing the name in the registration process. For registering website owners with the social commercial network web portal, an E-mail is required to be sent from the respective website (domain) (Example: info@website.com) to the web portal. A verification process is carried out by the web portal and then the website owners receive an E-mail for carrying out the registration process. In the beginning of this process, there is a training picture shown beneath the domain registration form in order to enable the users to become more familiar with the domain functions and Room names selecting process. For example, the Room name of a registered user will be like www.WebPortalName.com/RoomName. The feature of the Room name reduces the fake pages and the pages have a real credit because every web page corresponds to a Room belonging to a specific person/member of the web portal 101. Several warnings are displayed below the domain registering form to the user (For Example, the user is prohibited from changing any filled-in information after a domain registration). If the user exits from the second step of registration process or does not complete it, the user is deprived of a membership with the web portal 101. In the next time, the second step of the registration process must be completed, when the user wants to use the web portal 101.

The Third step of a registration process is to select a desired interest category. The user must mandatorily provide at least one interest to which the user desires to join. In this step, a blank field is displayed for the user to type or enter a desired interest. After typing one or two letters of the word, a guessing/dictionary system of the web portal 101 initiates and displays all the interests registered on the web portal 101 and all members with an interest are displayed to the registering user. For example, when the user types "mu", then "music", "musical instruments", etc are displayed as already registered interests. If the desired interest of a user does not exist on the web portal 101, the user is allowed to add a new interest. For this purpose, the user clicks on the "new" button and types the new interest and then adds the new interest in the web portal 101 database. After an addition to the database, the new interest is made visible to the other users. The newly added interest is displayed for selecting as a desired interest for members and a newly registered user.

The Fourth step of a registration process is for choosing friends/members of same interest from the previously registered users of the social commercial network. In the fourth step of a registration process, a list of people/members with the same interest is displayed for selecting. The user is allowed to select and follow the updates of the selected member. A process of following the updates of one or more users and friends is referred to as Observing. In this Observing process, a relation is unilateral and the assets such as data, invitations, ideas etc., go from the user to an observing member. The observing member is called as the observer. The fourth step of a registration process provides the user to add an interest and then see the people/member with the same interest. The fourth step also allows the user to search for a specific person among the other registered members/people. The fourth step is not a mandatory process for registration and the user is allowed to skip the fourth step to move to the next step in a registration process.

The Fifth step of a registration process enables the user to accept the terms and conditions of the web portal 101 and to invite one or more friends. The user is successfully registered with the web portal 101 after accepting the terms, conditions and policies. In this step, the user completes the registration process and a congratulatory message is displayed. At the end of the fifth step, an option for inviting one or more friends is provided to the user. An invitation form for inviting a friend is provided to the user on clicking the option. The user invites the friends to the social commercial network web portal using one of the E-mail providers (Yahoo™, Gmail™, Hotmail™, etc). Similar to the fourth step 4, the fifth step is also not mandatory and allows the user to skip and enter the Room. After finishing a registration process, the user enters the Room.

According to one embodiment herein, an icon indicative of the progress of a particular step is displayed over a user registration progress page. The icon is provided for every step of a registration process. After confirming the first step of a registration process, a green light is shown next to the first Step and the user is directed to the second step. The green light next to the first step indicates that the user is satisfactorily provided the required information. Similarly the green light is shown after the completion of each Step in the registration process. After completing the user registration process, the user enters a user interface of the web portal. On the first page, a web page relating to the user is displayed.

According to one embodiment herein, a section "Interests" is provided to the registered users. The Interest section is the field that the user likes to work on. The user defines his/her interests and finds one or more users who have same interests (same-interest friends) and interacts with them. If the user's interest does not exist on the web portal, the web portal provides an option to create an interest and invite one or more users to that newly created interest. The user-created interests are not exclusive and one or more users are allowed to choose as their interest and be active in that interest. Each interest has a specific webpage containing all information about the particular interest which makes access easier for one or more users. The interest webpage includes Recent joined users to that interest, Recent data of that interest, Recent Rent Minds in that interest, The best and most-selling data of that interest, Suggesting related interests to that interest, The suggestions which are offered in this page are also related to that interest. The user is allowed to hide some interests using account setting which the user does not intend to make visible to other users.

With respect to FIG. 1, the Privacy policy header 105 of the entrance page and the Home page enables the user to determine/judge a part of information to be displayed for one or more visiting users of the Room thereby enabling the user to define privacy. All parts of the web portal, such as asset, profile, invitations, messages, etc., related to the user are customized/edited. For example, the user sets that the contact information is displayed only for a family or an asset is purchased only by friends or only my friends are allowed to send a message. The user is further allowed to open the Room to only one friend category or one interest. The Privacy policy header 105 is provided for the user to control all the profile setting in a better manner and effectively.

According to one embodiment herein, the registered user logs in the web portal and a first page (hereinafter Home page) is displayed in the user computing device. When the user logs in the Web Portal for the first time, a list of people/members with the same interest similar to the logged in user, are suggested. The suggestion is primarily due to the interest category input by the user at the time of registration. The user chooses a member from the displayed list and adds to friends list. The user is allowed to add people with different interests to those chosen previously and to connect the people with these interests.

According to one embodiment herein, a web portal recognition rate diagram is provided on the top of the Home page. The recognition rate diagram shows how much a registered user recognizes the functionality of the web portal. For every activity such as inviting friends, sharing an asset, sending invitations, etc, some recognition points are provided. If the user actively participates in all these and other functions of the web portal, the user stands to gain some more recognition points. When the recognition point reaches from 0% to 100%, the user is awarded with a gift based on the recognition points. The gift is any one of a free space awarded from the web portal, some extra features, accessibility etc.

According to one embodiment herein, two tabs namely "Desktop" and "Recent updates" are provided in the recognition rate diagram displayed below the web portal. The Desktop is a default part of the front page after the user logs in the web portal. All the applications and parts/sections/tabs of web portal are displayed as a list for the user in the Desktop. The user is able to easily access to each part of the web portal and is also allowed to pin each desired part or applications to the Desktop. The applications in all the web pages of the web portal are easily accessible. In the Desktop, any new entries/updates of any parts or applications of the web portal are displayed as indication/notification. For example, when there are three new unread messages, "3" is displayed next to a messages icon. In case any friend has sent two asset files (which may include pictures, article, video, audio etc.), a number "2" is displayed next to an asset icon, indicating the user that there are two new asset files.

In the "Recently updates" part/section, the most recent items which are shared by members and Observed by the user, are displayed. The Recent updates including different website links, image links and/or some written text, are shared by the user with his/her Observers. For Example: Amirhossein said: I have just shared a new asset. Please buy an asset link.

According to one embodiment herein, the web portal provides the user with a capability of following the updates of one or more users or members. The user selects one or more users with the preferred interest and adds in a list. The list is termed as an Observed list and the added members are referred to as Observed users. On the other hand, a second list comprising the list of one or more users who are following the updates of the user is displayed to the user. The second list is termed as Observing list and the members in the Observing list are termed as Observers. For example, when a university professor is registered on the web portal, the students of the professor observes the activities and contents of the professor and get informed of the latest or new events such as latest asset, invitations, discussions, etc. If the professor wants to know about the contents of the students, the professor is allowed to observe an individual student. The selling of asset, gaining credits in currency and scores, strives the user to increase the number of observers to send the asset to the members quickly.

According to one embodiment herein, the various parts or functionality in the Home page of the social commercial web portal comprises the user name, a user score, a chat box, a list of online Observers and a list of online Observed members.

Figure 2:
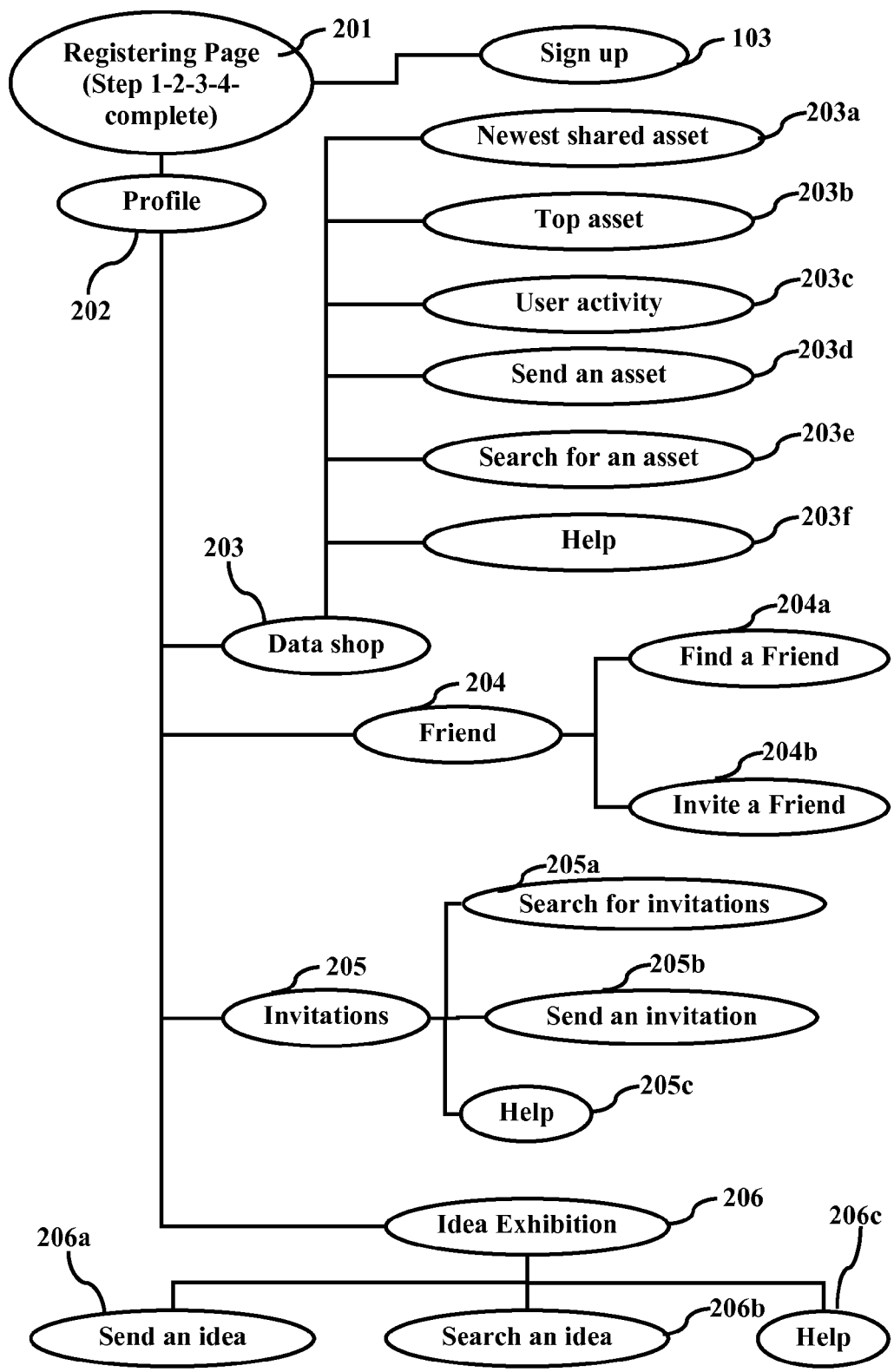
FIG. 2 illustrates a functional block diagram of the web portal of a social commercial network for interacting and trading assets among users, when the user logs in after the registration process, according to one embodiment herein.

FIG. 2 illustrates a functional block diagram of the web portal of a social commercial network for interacting and trading the assets among users, when the user logs in after the registration process, according to one embodiment herein. With respect to FIG. 2, a user registers with the social commercial network web portal through the Sign up header 103.

The user completes a five step registration process 201 and creates a user profile 202. The user further updates the user profile 202 by uploading an image in the web portal. The Home page also comprises a Discussions tab, a Data Shop tab 203, a Friends Managing tab 204, an Invitation tab 205, an Idea Exhibition tab 206 and a Finance tab.

With respect to FIG. 2, the profile 202 is unique for each registered user, which contains the general and professional information of user. The user manages the profile 202 information and also has control over the display of the profile 202 information by using account setting. The Room name presents the user's profile 202 and by selecting the Room name, the user's profile 202 is opened. In the profile 202, the user is provided with options such as Recent updates (updates in sharing and other things), User's information, Status, Interests, Friends, Observers, Avatar and cover image, etc. The User's information includes general details, contact details, professional (work) information, other profile information in other social networks etc. Sharing is default in the first page of the profile 202 after logging in the web portal inside the user's profile 202 to provide the capability of sharing content among friends and observers. Recent updates of one or more user's activities such as data creating, Rent minds, responding to answers, buying data and etc, are shared automatically with the user's friends as a notification. The user is able to introduce the data, advertisements, assets, etc by sharing them with friends or observers.

According to one embodiment herein, the user selects the Discussions tab from the Home page and a new window/web page relating to Discussions tab is opened. More particularly, the Discussions tab is provided in the user Room. The Discussion tab allows the user to create several discussion forums according to different interests. Similar to a Room name, the discussion title is also specific. The user Room and discussion title is addressed in a simple manner for the members to understand (Example: Web Portl.com/Room/title. In this link, Room refers to the Room name of the user and the title refers to the title of a Discussion (subject)). The user notifies the members about the desired discussion and invites the members for discussing the subjects. The Discussions web page provides a discussion creating form which has the following sections at the top. The following sections are a "Discussion title", a "Discussion description", a "Discussion cover image", a "Sharing discussion", a "Discussion interest" and a "Friend inviting" sections. The "Discussion interest" section allows the user to provide a preferred name of an interest in which the discussion is required. The "Sharing discussion" section allows the user to share the discussions with the members, the friends, observer, or invited users of same interest. The user is allowed to create a predetermined number of discussions, preferably five. Further the user is also allowed to pay a currency to the users participating in the discussion. After filling the discussion creating form, a discussion request with the discussion title is sent to the members comprising invited users, users of same interest and users with permitted access to join the discussion. All the members are notified about the discussion and the timings in the respective Rooms. An "Inbox" and "My Discussion" icons are present below the Discussion part/section/tab. The Inbox provides a most recently shared discussion by a second user in the same interest. The "My Discussions" icon provides a list of discussions created by the user.

According to one embodiment herein, the user selects the data shop 203 from the Home page and a web page relating to the data shop 203 is opened. The Data Shop 203 is one of the most important parts/windows of the website and enables the user to earn money by sharing a respective data/asset including film, music, picture, text, Zip files etc. The data shop 203 enables the user to buy the shared asset and earn money or share a new asset with the friends. The user is also able to sell an asset that includes the advertisements, the scientific articles, the picture collections, the videos and everything which are converted into a text, video and pictures. The Data Shop 203 is the best place for making money and allows the user to share a respective asset among the members and friends of the same interest. The shared asset is distributed to the members of a specific interest with the best selling analysis.

The Data Shop 203 in a web page offers a list of sections corresponding to a Newly or recently shared asset 203a, a Top asset of the week 203b, a User activity in data shop 203c, a sending of an asset 203d, a Search for an asset 203e, a Help 203f, a My asset, a Purchased asset, a Best asset, a Statistical chart and a List of most shared asset from the upper menu list of the web page. By using Data Shop 203, the user is also able to create an asset, buy an asset, marketing of an asset and search for a specific asset. The Sending of an asset section 203d enables the user to send an asset, after filling a sending form. The user provides an information on Name of the asset, brief description about the asset, a picture, video or anything as a sample of the asset, an asset file uploaded from the computing device, a interest to which a data relates, and sends an asset as a free or paid version with a currency. If the user chooses to send the asset freely, then the user also submits some explanation regarding the motivation for sending the asset freely Example 1: I tender this asset as a gift to my friends, Example 2: the user wants to sell a scientific PDF article. So the user provides the subject as "an article about dentistry". The Explanation of the article is "in this article, the factors of teeth decay and the solutions to prevent it are mentioned". Below the explanation, the user uploads the PDF article and quotes the price and then disseminates/circulates the article among friends with a medicine interest. One or more users or members interested in buying the article, pay the currency and receive the PDF). The members also provide the scores after reading the article. If the user chooses to send the asset in a paid manner, then the user also fixes some currency as the price for the asset. If the second user buys the asset, the user earns the money and the owner of the asset also earns the money. In the next step, the user selects the asset from the computing device and a picture as the asset cover. The asset is any one of a document, an image, a video, a presentation etc. Finally the user selects an interest in which the desired asset is to be shared. The user sends the asset to the members of the selected interest.

According to one embodiment herein, the user who sends the asset obtains a credit from the friends and only an asset with a high content is disseminated or circulated or shared. The sender of the article collects/gets a good credit. As the user takes an advantage of sending the asset to one or more users or members, the asset is further forwarded eagerly to other friends at a next level. Every level of friends gains a certain percentage (preferably 50%) of the asset price for sending the asset to the next or subsequent level and the online account is charged with the respective asset price. The user is allowed to block the accounts of one or more users who send a poor quality asset after a preset time, preferably two times. So the member always strives to send a high quality asset and increases the list of friends with the same interests respectively to earn more money quickly. Before buying an asset, the user is allowed to see the score of the asset and decides to buy afterwards. The member who enjoyed and earned money from a specific asset is able to send the asset to the friends of respective interests and gain a fixed percentage of the price of the asset. For example, one user likes and wants to share an article about dentistry with his/her friends. After sharing, the friends of the user buy the asset and hence the asset price is divided between the user who shared the asset and the owner of the asset. The asset is registered in a web portal database with the name of the owner of the asset and the price fixed by the owner of the asset. When one or more friends find the asset by searching or from the owner's profile and want to buy it later, the price is directly transferred to the owner's online account. All the assets are found by an advanced search. The user is able to search an asset sent by the friends or members with the same interest in the advanced search section for a suggested asset.

The "My asset" section enables the user to view all the assets which are shared by him/her and all the comments and the scores relating to each asset. The Purchased asset section enables the user to view the history of the purchased asset. If one of these assets is lost, the user is able to download the lost asset from the web portal. Thus the user is able to acquire or recover the lost asset without paying the price of that asset again.

The Statistical chart section presents a statistical chart of the user's activities in the data shop 203. The Statistical chart enables the user to analyze his/her activities. If the activity of the user is poor, a notification is automatically sent to the user stating the poor active condition and a recommendation for increasing the activities is sent. A diagram of the shared asset with the selling statistics and review times or intervals of each asset is also displayed. The statistical chart is made for each interest and discloses the user activity rate in that interest based on the acquired scores also known as stars. Each star indicates some scores and is applicable in all parts/sections such as asset, invitations, and Ask & Answer sections. When the user sends an asset, the members give scores using the stars to the asset of the user, answers to the invitation and answers to the question. The scores are recorded for the user of the specific interest database. The acquired scores which are indicated or marked by the letters/stars are placed on the statistical chart. One column of the statistical chart displays or indicates an interest while the other column displays or indicates the acquired scores. The statistical chart is displayed in the user Room and shows the user active condition in each interest. For example, the user is more active in the programming interest and shares good asset and questions. The members give scores to the user activities. The scores are recorded and are shown as a statistical chart in the user Room and indicate the user activity 203c. If the column of programming is higher than the other interests of the user, the statistical chart indicates that the user is more active in programming field. The members or companies who search for a good programmer judge a preferred member in a better or thorough manner or effectively choosing a preferred member for a task. When the user keeps the mouse pointer still on the programming column on the Statistical chart, the extra details such as total data, questions and answers to the invitations are displayed. The user is allowed to deselect his/her interest from getting displayed on the Statistical chart. The user is not allowed to change the score.

The Best asset section enables the user to see the best asset shared by friends. The Best asset is defined and categorized according to the corresponding scores, total purchases and total viewers. The user selects the best data for viewing. Similarly the newest shared asset 203a provides a list of new asset shared by members or friends of the interest.

The list of most shared asset part/section contains the newest asset shared by the user Observers on the user desired interest. The user is also able to see an asset, a name of a sender or member of the asset, an asset score and a price. Based on the interest and desire, the user buys the asset.

The "Buy an asset" section allows the user to buy a data shared by one or more users. The user is directed to a specific web page of the asset upon selecting an asset or a cover page of the asset to be bought. Details such as information, scores, comments etc of the selected asset is displayed to the user. Further the asset details comprise an asset title, asset description, asset price, interest, comments. Scores, total purchase etc. By clicking on "Buy link", the user is directed to a page comprising a final agreement for buying the asset. The price of the asset is deducted from the user's online account. After buying, the user downloads the asset.

The Marketing of an asset helps the user in earning money by selling asset and gaining percentage from the sale. This feature is useful for not infringing copyright law and earning money by those users who are professional in marketing.

The tab for a Top asset of the week 203b displays a list of top best selling and best score data of the week in addition to the price and score which makes the user familiar with trading procedure on the web portal and popularity of other asset. The Top asset of the week introduces the best selling data to the user.

The Search for an asset section 203e is useful for the user while searching for a special asset. The user searches for the desired asset. The desired asset is searched out based on an interest of an asset, a name of the asset, a score of the asset, a total purchase, and a price of asset, a type of the asset (image, video, text and etc.), etc. The user decides or sets a basis or criteria for finding and buying the desired assets. The user views the received asset sent by the member and buys the asset. The user clicks on the asset and enters a security password for buying the asset. The security password increases the security. After entering the security password, the details related to the asset and the price of the asset in US dollar and in the currency of user country are displayed on the screen of the computing device. Finally the asset is purchased after confirmation and the user downloads the bought asset.

The Help section 203f assists the user in understanding the operation of the web portal relating to the assets. The Help section 203f provides a demo for using the data shop 203.

According to one embodiment herein, the user selects the "Friends Managing tab 204" of the Home page. In this part, the user manages one or more users who are his/her Observers and one or more users who are observed by him/her. The user is able to find/locate a friend by using a Find a Friend option 204a. The user is allowed to view the added friends for each interest in each category. In general, the user classifies the friends based on the interests. There are two default categories namely the family and friends. The user is provided with an option for editing or adding a new category. The "Friends Managing part/tab" also provides the capability to the user to pick a color for any one of the categories, for example: green color for family category, red for classmate category etc. The categorization is done based on an interest and the color simplifies managing friends. In a friend categorization, the interests are separated and the user is able to search for his/her friends in an interest of the computer and categorize the interests into different categories. The user is able to arrange friends by using a drag and drop function. Further, the user searches for a specific user among all the registered users and adds the searched user to the friend list. When the friends are categorized, the user decides easily about the friend to whom the data is to be sent. The friends are displayed according to the respective interest. The user is also able to see all the blocked accounts. The user performs an advance search for a specific interest. The user is further allowed to invite the friends by using Invite a Friend option 204b to the web portal by using any of the E-Mail services.

According to one embodiment herein, with respect to FIG. 2 the Invitation section 205 provided on the Home page enables the user to send a questionnaire or a poll to friends and observers for asking the comments about a specific subject. Alternately, the user sends the questionnaire of multiple choices or essay questionnaires to the members of a desired interest for comments. The Invitation section 205 allows the user to collect information about a specific profession from the professionals of the same interest and to make some improvements in his/her own profession. Further, the user who sends the invitations to one or more users assigns some currency to the invitation. The one or more users who answer the invitation earn the assigned currency and thus the user sends the invitation only to those who has specialty in the same interest. The process of earning a currency encourages the members to provide the right and the useful answers. The user is provided with the authority of blocking one or more users or members, who provide the wrong and useless answers to the invitations. The blocked member does not receive the invitation again. Still further, the user provides the scores to the answers for the invitation. The one or more users, who get more scores receives more invitations and allows more money to earn.

The user selects the Invitation section 205 from the Home page, which opens a new web page relating to the Invitation. After entering the Invitation section 205, the user looks into the following parts or sections or tabs. The following sections are a Search for an invitation 205a, a Send an invitation 205b, a Received invitations section, a Sent invitations section, a Most recent invitations section, a Top invitations and an activity statistics in Invitation section 205 and a Help section 205c. The user selects the Send an invitation tab 205b which asks the user for the following information, an Invitation title, an Invitation deadline, a Validation of invitation, an Explanation, an Invitation subject, a Brief description about the invitation, currency assigned to the invitation, an interest related to the invitation and Picking a friends group for sending the invitation. The invitation title is displayed to the members and indicates the title of the required poll questionnaire, for Example', an invitation about the color of this year. The Invitation deadline allows the user to set a deadline for the invitation, after which the members are deprived of answering to the invitation. The Explanation provides some description about the proposed question or the reason of sending the invitation. The user is allowed to select the manner of sending the invitation whether through a free version or through paid version by a currency. The members who answer the invitation receive the assigned currency. If the amount of currency accumulated in the user's online account is less (according to the assigned currency to the invitation and number of members to the invitation), a warning message is displayed and reminds the user to increase the currency amount in the online account. In the next step the user picks a picture as the invitation cover and specifies the type of the question. The question is any one of a multiple choice type or subjective or essay type, for Example: which color is more suitable? A: blue B: red C: green D: none of them or which color is the best for a night dress? In the last step, the user selects one or more users or members from the desired interests and sends the invitation. The Invitations are sent to the user Observers and is displayed on the invitation web page of the user room. The one or more users are able to see the user invitation message through the user Room.

The response to the Invitation is provided diagrammatically/pictorially to the user. The pictorial representation assists the user in accelerating the analysis of the answers. The response is also provided in other formats. Any invitation received by the user is displayed on both the Desktop of the user and in the Received invitations section. The user answers the invitation at a preferred time.

The sent invitations section provides the list of invitations which the user has sent to the friends and members of same interest. The total number of answers to the invitation is also displayed to the user.

In a search for an invitation section 205a, the user is allowed to answer freely the invitations which are still valid and earn more scores. The Search for an invitation 205a is performed according to an invitation title, an interest related to an invitation subject, the total answers available and Invitation subject.

In the Most recent invitations section, the user is able to view the most recent invitations sent by one or more users in addition to an invitation subject, an invitation sender and a date of the invitation. The user selects an appropriate invitation and participates in the poll, questionnaire etc as mentioned by the sender of the invitation.

The Help section 205c provides assistance related to the Invitation section 205 with demos, frequently asked questions, etc.

According to one embodiment herein, the user selects the Idea Exhibition section 206 from the Home page. The Idea Exhibiting section 206 allows the user to share an idea briefly with one or more users or members and corporations. The members, who are interested in the idea, contact the user for trading. The user is able to sell the ideas and the thoughts to earn money through trading. In an idea exhibition section 206, the following sections or tabs or options are displayed: a Send an idea tab 206a, Search an idea tab 206b, a Help tab 206c, Most recently shared ideas, Top ideas, user activity in an idea exhibition, My ideas, Exhibit idea, and idea advance search. Further in the Idea Exhibition tab 206, the user is allowed to explain an idea briefly and determine price. Then the user shares the idea with one or more users who have the related interest. Any company and one or more users interested in the idea, connect to the user through the web portal and according to the suggested price, negotiate with user and finally buy the idea. In the idea exhibit part, the user chooses the interest in which a preferred idea or plans is required and searches for the idea among the registered ideas.

The Send an idea section 206a enables the user to send an idea and share with the friends of same interest. The following items are figured in this tab/section: an Idea title, a Brief description about the idea, a detailed description about the idea, an idea price, and an interest related to the idea. The Brief description of the idea is visible to all the members of the users. The Detailed description about the idea is not displayed to anyone. If any one or more users are interested in the idea, the idea owner is contacted.

The Searching for an idea section enables the user to search for a desired idea in the desired interest. After finding the idea, the user contacts the member who is the owner of an idea. A form for searching an idea is displayed to the user. The form comprises an Idea title, an Idea price with a minimum to maximum price, an interest related to the idea and an Idea score with a minimum score to a maximum score.

The Most recently shared ideas section is the first page of idea exhibition section 206 and the most recently shared ideas by one or more users are displayed in this section. In this section, the ideas are shown in a list with the senders being one or more users, the scores and the prices.

According to one embodiment herein, the user selects the Finance section or tab and a web page relating to the Finance section or tab is opened. In this part, the user manages the financial processes such as a money deposition, a transfer and a withdrawal etc. The user registers one or more bank account numbers in the web portal. The user performs all the financial operations related to the web portal using the registered bank account numbers. If the user wants to change the bank account number or the user wants to enter a new bank account number, a predetermined time period, such as a week time is taken for processing and confirming the new bank account number. The user receives an E-Mail and Short Message (SMS) for keeping the security of the user account.

Further, the Finance section or tab is sub divided into five categories. The five categories comprise a Money deposition, a Money Withdrawal, a Money Transfer, a Financial Profile and a Turnover. The user deposits the money using a Money deposition into the account. The users at this part deposit the money to the online account using the home banks and then convert the money into the currency. Alternately, the user transfers money through online payment gateways such as PayPal or using Visa/Master/Egold cards and start a financial transactions on the web portal. The currency is referred to as "Drops" and is common to all the countries. In addition to the above, there are some prepaid charge packages for the user. If the user buys the charge packages, there is an advantage of receiving some free space as a gift or some extra value more than their price in addition to charging the online account. Example (e.g. a user buys a charge package for $90 but $100 is added to the user's account. After buying the charge packages, the user receives a code number. The code number must be entered in the specified field and then the online account is charged. This allows the user to send the code numbers to the second user who does not have a bank account. So the second user is able to charge the online account and/or awarded with some free space. The user is also able to add more currency to the online account by selling the asset (thoughts, ideas, plans, comments, experiences) to one or more users (members) who need the asset.

The Money withdrawal allows the user to withdraw all currency earned through the web portal, and transfer the exchanged currency into the bank accounts. The user needs to fill a form with the following information to fulfill this purpose. The information required are a user name, surname, valid E-mail address, postal address, type of account, an account number, an amount of money such as desired withdrawal money and submit the form to the web portal. The desired money withdrawn from the online account is limited. The user is allowed only to withdraw the amount which is determined. The requested amount of currency is displayed in US dollar and the currency of user country. The user approves the withdrawal and money is exchanged. After filling the form for withdrawing the desired money, a confirmation form is displayed. After a confirmation, the user receives a tracking number. The user is able to track the money exchange process. The web portal investigates user's financial activities, any possible claims, copyright infringement and etc for issues and upon absence of any issues approves the withdrawal money. Alternately, the withdrawal money is directly sent to the one of the user's bank account or is received in the postal address as a cheque in the name of the profile holder or the user.

The Money transfer allows the user to transfer some currency from the online account to the online account of a friend. The currency transfer is limited to prevent hacker's abusive actions or other security-threatening actions. For transferring the currency, the user chooses the specified person from the friend list and determines the amount of currency to be transferred. The currency amount is displayed in US dollar and the currency of user country. After filling the form for transferring the money, a confirmation message confirming the selected person is displayed to the user and the confirmation message contains all information related to the selected person. The confirmation message decreases the possibilities of sending money to a wrong member. After a confirmation, the specified amount of currency is transferred to the friend of the user.

The online account charging process, an exchange of currency into real money and withdrawal are done through the contracts between the web portal and any international bank. For all trading transactions between the buyers and the sellers, 5% of the buyer share and 5% of the seller share are collected and credited to web portal as a commission and revenue. But the percentage of revenue and commission is varied as per conditions. Every one thousand (1000) currency is equal to one (1) US dollar and is exchanged into able to the currencies of all countries.

The Financial section enables the user to edit the financial details. The financial details include a name of account holder, a type of account, a desired bank or a bank of choice, etc. The Bank of choice allows the user to add a plurality of bank accounts. When a financial operation is performed, the user is asked to choose one of the bank accounts for transaction.

The Turnover section assists the user to view the last transactions as a list such as a mini statement. All the details related to a financial process such as buying the asset, money transfer, online account charging, money withdrawal, etc., are provided with tracking numbers related to every transaction. The user views and manages all the details of his/her financial operations.

According to one embodiment herein, the transaction section of the web portal allows the user to select the spiritual values in addition to the material values. For example, an institute which specializes in environmental activities asks for plans, ideas and experiences and sends the same to one or more users or members with an environmental interest. The spiritual value of the appeal is "service to humanity". In this section, the members are also able to sell advertisements. The members put the desired money to spend on advertising in the respective online accounts. Then the advertisement file ID is sent to the friends with the same interest as the advertisement. Once the friends of the member open the advertisement file, the assigned or the fixed price is automatically moved to the respective online accounts. Then the friends further send the received advertisement file to the respective friends at the next level. When the respective friends open the advertisement file, a predetermined percentage, preferably 50%, of the advertisement price is paid to the friend and the remaining price is paid to the respective friends of the next level who opens the advertisement. For example, Apple™ Company wants to introduce a new iPhone mobile device. First, Apple™ charges the respective online account with a desired amount for advertising. Then Apple™ fixed the price of the advertisement which is to be opened by members of the web portal. The assigned price is automatically transferred from Apple™ online account to the online account of the members who open the advertisement. Then the advertisement file is sent to all the members with audio and video interest. The advertisement is further sent to the respective friends and the advertisements penetrate and disseminate professionally through this way among the members of the web portal.

According to one embodiment herein, a Rent Minds option is provided for advertising in the online social commercial network. The user uses the Rent Mind to earn money and get familiar with new products and contents in his/her interests/interest. In "Rent Minds", the user rents his/her mind and get paid for keeping the advertisement content in the mind. Further, the user views and responds to advertisements which are consistent with his/her interests/interests. The user responds to advertisements according to his/her interest or profession. This kind of advertising penetrates deeply in the user's mind and stays longer. Additionally this type of advertisement is totally targeted and companies who seek for the most influential way of advertising finds this advertisement method best and replace the existing outdoor, TV, newspaper/magazines advertisings with the user's Rent Mind. When the user visits the Rent Mind section, the most recent advertisements released in the Interests are displayed. The user earns money by responding to the advertisements. The user and companies rent a user's mind and leave the advertisements on the Rent Mind in any interests relates to the advertisements. After going to the Rent Mind section for creating an advertisements and renting a mind, the user provides some information in two steps. The first step comprises an advertisement title, an advertisement description (including text or link), a question (in check-box form and no limitation in number of questions), an answer option (four options or more), a right option, etc. The second step comprises a Cover image, a Related interest, a Reward (amount paid to the responder), a Responder's score (in this part scores of responders is determined, for example two stars and more), a Deadline date, a Rewarding total true answers (for example user decides that reward goes to one who answers four out of five questions correctly), a Time of answering (if users answer the questions incorrectly, they are allowed to try answering as many times as creator allow. This causes the advertisement sticks longer in user's mind), a Gender of responders, an age range of responders, a Country of responders. Normally, in this part high-scoring one or more users are chosen and this leads the user to be more active to get more scores and be invited to answer advertisements and gain money. The advertisements remain till respective deadline date and after that the advertisements are removed from the list. The advertisement creator considers an amount for the advertisement and releases again. This causes stir among one or more users to try harder to answer to the advertisements. After releasing, the advertisement is placed in the most recent advertisements list in that interest. The one or more users answer the questions or in other words rent respective minds to memorize the information and get paid in turn. There are two parts to manage advertisements, where the first part is Created Ads. In Created Ads part, the one or more users have control on respective created advertisements and review the information such as number of responders, balance, releasing date, etc in order to create more targeted advertisements and get better outcome. The second part is Answered Ads. In the Answered Ads part, the one or more users review the advertisements that they answered before. If the one or more users had incorrect answers, they know the correct answers after deadline date. This helps the user to learn about a specific issue and do better in next advertisements. Each advertisement has an own webpage and the one or more users views the webpage by clicking on the advertisements. This page includes a Reward, Interests, Maximum responders, etc. Commenting is allowed only for those users who answered the advertisement. A searching system is considered for advertisements in order that the one or more users find the advertisements better in respective interests and answer them according to the stars. The one or more users find a specific advertisement in a specific time and by a specific reward using the advance search.

According to one embodiment herein, the web portal provides a search engine for searching ideas, invitations, shared asset, etc among the members of same interests. The user is able to search for a preferred one or more users of a specific interest based on the nationality, city, age, etc. The web portal also allows the user to search and find the desired invitation among the invitations sent with respect to a subject or one or more users who sent the invitation. The search provides the user with an opportunity to increase the scores and the credits. In case of an idea searching, the user searches for an idea in a specific interest or subject and contacts the owner of an idea if interested. Every section/part in the web portal provides an advanced search option which allows the user with accurate and exact searching process and filters. In an asset searching process, the user searches for the specific asset such as a medical article in a preferred interest based on the asset subject, price, score, etc and then contacts the owner of the searched, specific asset for buying the searched specific asset. A searching form is provided on the top of every web page and in all parts of web portal for searching easily. The user is provided with a setting in the web portal to stop displaying any undesired information to other friends and members of the same interest. For example, the user sends an invitation. The user is allowed to limit that the sent invitation be only shared to those who are selected or fixed by the user and no one in the web portal is allowed to search and see the invitation.

Figure 3:
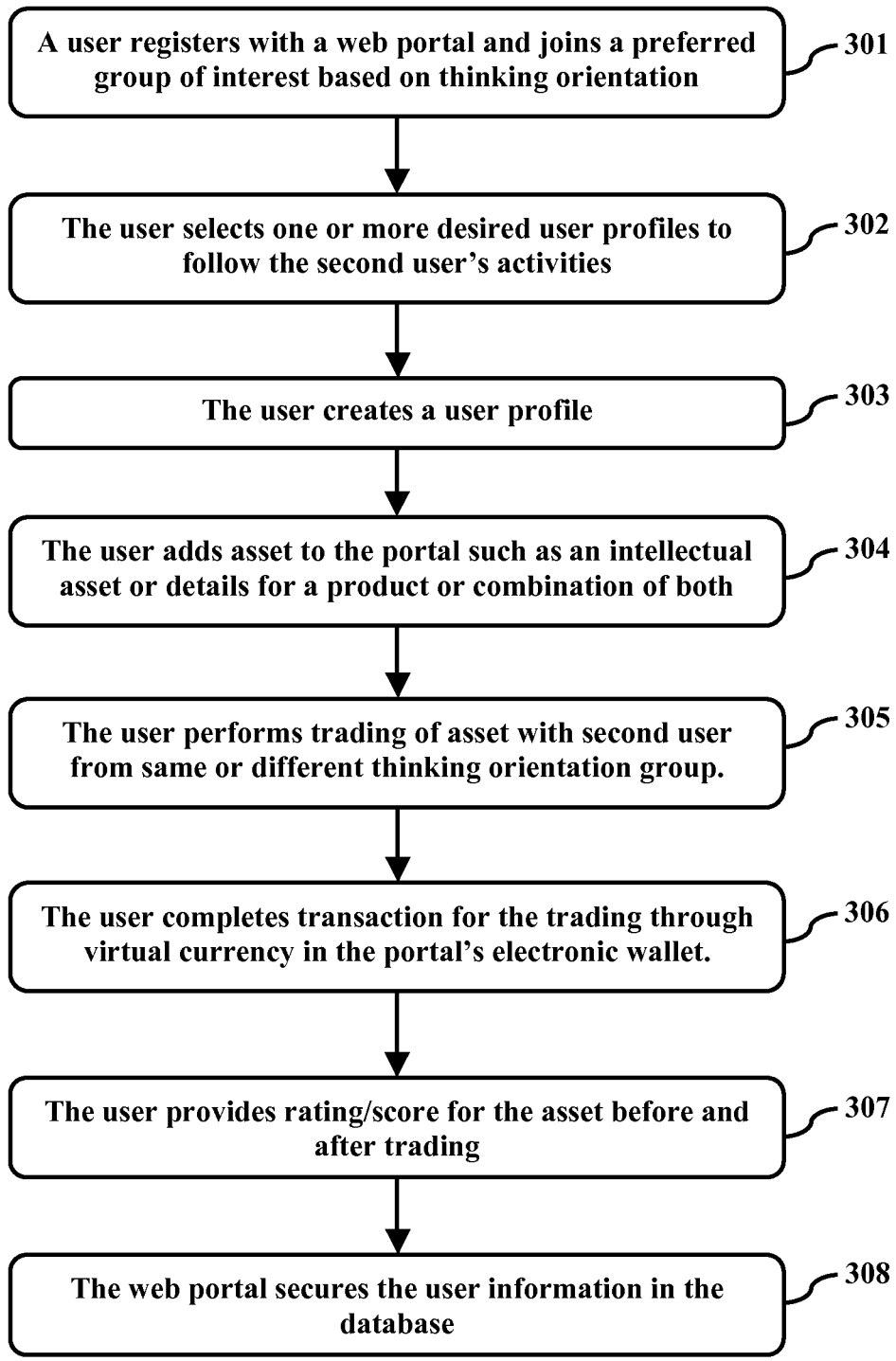
FIG. 3 illustrates a flow chart indicating the process of accessing the social commercial network web portal to interact and trade assets among one or more online members, according to one embodiment herein.

FIG. 3 illustrates a flow chart indicating the process of accessing the social commercial network web portal to interact and trade assets among one or more online members, according to one embodiment herein. With respect to FIG. 3 a user opens the web portal in a computing device and registers with the web portal by providing the user credentials. The user credentials comprise a Name, age, address, contact number etc. During the registration process, the user directly joins a preferred group of users with same interest (301). The user provides required information in the web portal and completes the registration. The user enters the user interface of the web portal. The user browses the activities of one or more users. The user selects one or more users and adds the preferred user to a list of users for following the updates. The users in the list are called as observed users (302). The user completes the profile by providing an image, and by inviting friends to join the web portal (303). The user adds a desired asset such as discussions, article, images, products etc. in the web portal for sharing with the members of the same interest (304). The members of the same or different interests view the shared asset and decide to buy or discard. If the members are interested in the asset, the user trades with the members with a currency (305). The currency is stored in the online account of the user. The user performs the trading with the currency (306). The user provides scores to the members who provide useful comments on the asset. The members are also allowed to provide scores to the traded asset (307). The web portal secures the transaction amount and stores a history of transaction in a database. The web portal also provides the user to set an access level to the profile and also displays the specific parts/sections of the user profile to the members (308).

According to one embodiment herein, the Messages part/section on user Home page enables the user to send the messages to the friends or members. The user is able to connect and interact with the friends and members. The user is allowed to send the multiple messages to one or more users or members at one time. The messages are received in the inbox of the user.

According to one embodiment herein, the user is provided with a "My Room" section displayed at the Home page. The "My room" is included in the user profile. The user enters or edits the personal information. All the user information is editable and the user decides which information is to be displayed to members in the web portal. The "My Room" of user includes a message box. The user shares any asset including text, link, and asset with the Observers. The shared asset is provided under most recent updates section. For Example, Amir said: I have created a new interest. You can enter it. The sharing of asset enables the user to notify the members and observers about his/her activities. The My room section is a default display for the user room comprising a Room address, a Status, an Avatar, a Description, a Personal information, a Contact information and a My interests. The Room address is the user unique web address which is defined during a registration process. The Status is any one of a message, description and any text displayed under the Room. The Avatar is a profile picture. The avatar picture is displayed at the corner of the user Room. The user picks several pictures as avatar and the selected pictures are displayed randomly to one or more users. The Description allows the user to write some description about him/her for the members who visit his/her room. The Personal information contains information regarding user including name, surname, gender, date of birth, preferred languages, nationality, city, etc. The Contact information contains user personal email, business email, website address, personal phone number, business phone number, mobile number, home address and work address. The "My interests" part or section displays the selected interest of the user. The user is allowed to add or edit the selected interest. The user is able to view the interests of one or more users while viewing the profile. The web portal provides the user with an option to select an interest and view the total number of users in the selected interest. The web portal provides the Room with a special ranking, such as a Silver Room, a Golden Room and a Diamond Room. The Diamond Room has the highest ranking followed by the Golden Room. The Silver Room has the lowest ranking The difference between the different types of Rooms lies in the facilities available in the rooms. If the user wants more facilities, more currency is paid and the desired Room is owned or bought. The user is also provided with up-to-date information for improving the other Rooms to Diamond Room and takes an advantage of more facilities. The Rooms are obtained freely for a short time by the high-ranking members during special occasions and events such as Christmas.

According to one embodiment herein, the Status of the user further displays a score of the user in terms of stars from one to five, along with displaying amount of activities of the user in a specific interest. The user's status is formed by considering different criteria such as scores of created data by user, scores of activities in Rent mind, spending time on different parts of the website (staying on the website), sharing and other activities, buying other user's data, marketing the data, responding to the ads, being active in "Questions and Answers" section, attending and activity in "Request" section, total numbers of logging in and using the website, etc. These criteria influence total scores and accordingly user's status which is useful for user's gaining money in different interests/interests. The web portal allows the user to view a second user's status by selecting the status tab of the second user's profile. The Status tab reveals the interest/interests, in which the user is more active and more professional. The Status tab is also used to find proper individuals for team works, Rent mind for advertising, request and active users in different interests/interests. Also, those individuals who seek for commercial and professional activities take advantage of the status tab and employ specific user for a particular task.

According to one embodiment herein, the user Room is provided with dedicated specific space, for Example, 5 GB space. The user shares/stores his/her asset in the space provided to the user. In addition, the user profile has a section known as "file manager". Using the "File manager," the user deletes the asset and files or adds more space to the existing space. The extra spaces on the web portal are prepared as some packages for one or more users and more spaces are obtained by paying an additional preset amount.

According to one embodiment herein, the web portal provides a special scoring system called "WOOOOOW". Using the system, "WOOOOOW", the user scores the asset such as invitation, discussions based on a quality. From the first W to the last W, every letter equals to a specific score. First W equals to zero and means warning. When the user receives it for three times, the user is blocked by one or more users and omitted from the respective friends list. The system "WOOOOOW" has a special color spectrum for example from light blue to dark blue. The system "WOOOOOW" has a coloring spectrum taken from the colors of rainbow. The color codes for each letter in the system, "WOOOOOW" is as follows. The color code for the First 'W' is red. The color code for the first 'O' is orange. The color code for the second 'O' is yellow. The color code for the third 'O' is green. The color code for the fourth 'O' is blue. The color code for the fifth 'O' is purple. The color code for the last 'W' is violet. Red means warning and violet means happiness. The violet streaming arises from happiness and excite. Every 'O' equals to 1000 scores. The score of first 'W' is zero and the score of last 'W' has 2000 scores. This capability of scoring system "WOOOOOW" exists in all sections of the web portal and shows score for every part or section such as Data Shop, idea exhibition, sending an invitation, and discussions among one or more user. In addition to the "WOOOOOW" based scoring method, the user is able to express comments regarding any specific things like asset, articles, discussions etc. Using the scoring system, the user determines the value of any asset, invitations, discussions, etc., so that only the assets with a good score remains on the database of the web portal and the inappropriate assets are omitted gradually. So the members try to increase the scores and credits by sharing good and useful assets, invitations, etc. The user also tries to give the useful answers to the invitations received from one or more users. A company, organization and members send the invitations and take an advantage of receiving the useful and good answers. By the web portal credential system, the user is able to score the asset sent by friends or invited people.

According to one embodiment herein, an Ask and Answer section or tab is provided to the user. The Ask and Answer section or tab is one of the most useful and applicable parts of the web portal. The Ask and Answer section enables the user to share the questions among one or more users in a specific interest and receive the professional answers. After entering the Ask and Answer section, the user is provided with a form to create questions. The lists of recently created questions by one or more users in the interest are displayed. For example, if the user is interested in a music and fashion interests, then all the recent questions related to the music and fashion is displayed to the user. After preparing the question, the user fills up following sections such as Brief description about the question, interest relating to the question, an attached file including image or a short film for defining the question and Keywords defining the question. The filled in form and the question are sent to one or more users who are in the preferred interest. When one or more users answer the question, the answers are stored in the web portal database until the user deletes the answer. The user is notified of the received answers by E-Mail. After receiving the satisfied answers from one or more users, the user selects/clicks a "The question is answered" button. The selection of the button avoids one or more users from answering the question. If there is a discussion about the question in a discussions forum of the friends of the user, then the user is recommended to visit the discussion forum of the friends to get the answer for the question. The suggesting part or section of the web portal helps the user to find one or more users, discussions, data, etc. The difference between the "Ask and Answer" section and the "Discussion" section is that the discussions are shared with one or more limited users who are selected by the user in the "Discussion" section, while the question is shared with all the users with the interest related to the question at the "Ask and Answer" section to receive the answers from all members.

According to one embodiment herein, a Question and Answer section is provided to enable the user to ask questions about different interests from professional users in those interests and get the best answers. The user asks questions in the related interests, and receives answers to the question from one or more users in that interest. This question and answer is either a paid process or a free process, and the user who asks a question determine an amount to give to the responders. This process receives answers faster and better. After receiving plurality of answers, the user selects the best answer, and pays the amount to the responder. The Question and Answer section has the followings sub sections, Recent questions, Ask a question, Search for questions, My asked questions, Best questions, etc. The Recent questions are the first part in "Question and Answers" page and the user is able to view recent questions asked in his/her interests and answers them if interested. Scoring and commenting is only available to those users who answer the questions. In the Ask a question sub section, the user provides some information about the question such as Title, Description, Interests, Award to the best answer, Share the question according to the status and stars, other advance setting to receive the best answer fast, etc. The Best questions sub section is displayed in user's panel and is based on the question's score. This sub section enables the user to see highest-score questions in his/her interests which helps the user to get more information in the fields of his/her interest. The My Asked questions sub section allows the user to manage their asked questions and review the answers and scores. And then user must choose the best answer and give the award to the responder. Scores and best answers influence the status of the user.

According to one embodiment herein, a description of the important parts of the web portal is provided on the main page of the web portal. The unregistered and Non-member users access the main page before joining the web portal. The "Data Shop" and "Ask and Answer" sections are provided for viewing as a demo for the Non-member users. The Non-member users are allowed to review the asset shop gallery which contains the best-selling asset. If the Non-members are interested in an asset and want to buy the asset, the Non-member must register with the web portal first. At the Ask and Answer section, the Non-members are deprived of creating questions or providing answers to the question. Overall, the Non-member users are allowed to see the profiles and allowed sections but have to register with the web portal for performing the activities.

According to one embodiment herein, a Team work section or tab or window is provided to the user. The Team work section is activated for the user when a threshold score in the corresponding interest is achieved. The threshold score is set by the web portal for each interest. The Team work section creates a team of one or more users for a professional group. The team performs the activities on a work efficiently and has provides a better management on the work. When the Team work is activated for the user, the user invites the friends who are professional and have expertise in the specific interest for starting an activity. Also, the one or more users who work in the field of same specialty make a group/team and act under a room name (profile). All group members coordinates and make a data, advertisement, question, etc and share under the unique group room name. The user who reaches to a high level score becomes the group administrator and forms a group under a room name and use each other's knowledge and experience to improve the group's credit on the web portal. The administrator easily determines every member's percentage of the team revenue by answering advertisements, buying and selling assets, etc and the scores and payments are also divided according to that percentage. The Team work is useful for companies seeking for professional people in various fields. Teamwork also has status display. A user views the status of the Teamwork profile and compares with different status to learn more about each user's activity. A company seeking for professional users or Teamwork for helping in their required fields chooses a group of users according to the status and sends a request. The requests are sent to high-score users, and the user is paid by request sender per answer.

According to one embodiment herein, a company and/or a corporation analyzes the work of the team of one or more users. Based on the analysis, the company preferring to work with a really professional team assigns a task to the team members and receives the best outputs. In a team, the user creating/initiating the Team work is the administrator. The administrator determines or estimates the percentage of the team revenue for each member of the team. The members of the team are allowed to manage the data, the discussions, the invitations and other parts according to an access level. The access level to different parts or sections are determined by the individual scores in the Team members.

According to one embodiment herein, the web portal enables the user to select a skin or theme for the user Room. A default skin or color such as blue is provided for the registered user. The user changes a color of web page to different colors based on the preferred look of the Room. The displayed skins are designed in a color spectrum and a desired theme is created by the user. For example, the user selects red as a preferred color. So the Room is displayed in a red category, when the user enters the web portal.

According to one embodiment herein, the user is able to insert his/her professional specification using a profile setting. The profile setting contains the user information, personal information including private and non-private information, and a professional information and contact details. The user information is related to an editing of data such as the username, a password, a bank account number and the ranking such as silver, gold, diamond. The Personal information is related to an editing of a data such as the name, last name, date of birth, country, gender, uploading personal picture and etc. The Professional information is related to an editing of information such as mentality, interests, languages in which the user is proficient, occupation, etc. The Contact detail is related to an editing of a data such as the email address, mobile number, phone number, address, website address and etc.

According to one embodiment herein, a chatting and talking section is provided to the user. The user is allowed to have an online chat, and a talk and video chat with friends, Observers and Observed users. The Chat software is provided by the web portal to the user. The user downloads and installs the chat software in the computing device. The chat software makes the chatting easier and more comfortable. An icon for messaging is embedded in users profile to improve the accessibility.

According to one embodiment herein, the web portal provides a Browser toolbar. The parts and application of the social commercial network is provided in a web portal in a toolbar that is separate from the web portal to provide a quick access. The Browser toolbar comprises Messages, Discussions, Asset, Questions, Searching in the website and etc. The parts or sections or tabs are alterable by the user. The user is allowed to arrange the toolbar as required and download a Browser toolbar for a desired compatible internet browser. The users access the profile through this Browser toolbar.

According to one embodiment herein, the web portal offers an Offline access to all the functionalities in the web portal. The web portal enables the user to see the website in an offline manner and review the web pages that are already checked by the user. When the user opens a webpage, the content of the page is stored in the computing device. The user is able to access the web pages without internet connectivity. The Offline access enables the user to read the discussions at later time.

According to one embodiment herein, the web portal provides a suggestion tab which function based on the user's interest and data sharing. The suggestions tab assists a user in finding a specific person and information. The suggestion tab directs the user to a suggestion page where all the suggestion is displayed. The suggestion comprises details on an asset, Rent Minds, people, close interests, Question and answers, Request, Discussion, etc.

According to one embodiment herein, websites owners and weblog administrators who intend to share content on the online social commercial network are provided with Bookmarks. The Bookmarks are some icons in different sizes which are given to the users and the user in turn places them in their profiles.

Figure 4:
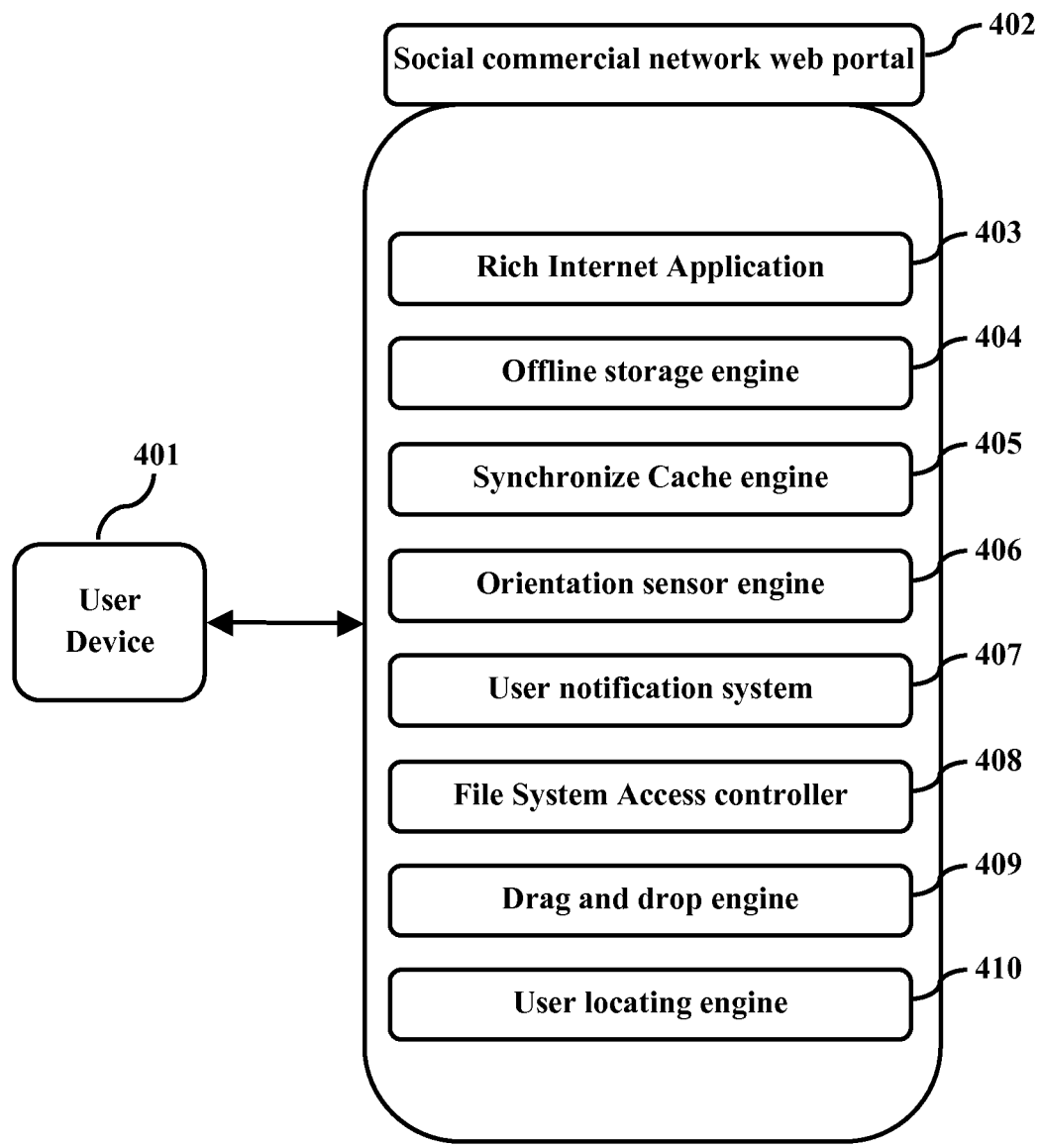
FIG. 4 illustrates a functional block diagram of a system for trading and interacting among on line users of the social commercial network of same or different interests, according to one embodiment herein.

FIG. 4 illustrates a functional block diagram of a system for trading and interacting among on line users of the social commercial network of same or different interests, according to one embodiment herein. With respect to FIG. 4, the web portal is loaded with Rich Internet Applications (RIA) 403. The user device is connected to the Social commercial network and the web portal 402 through a suitable communication network. The RIA 403 is similar to the applications in the operating system and desktop applications. The characteristics of RIA 403 include an appearance, a way of working, an interface, a speed, a high capability, a memory management, and an attraction for the user. A step of applying RIA 403 requires a coordination and harmony among the different sections. The condition for applying RIA 403 must be the same on both the web portal side server and the user side server. Since all the applications on the user side are run via an internet browser, utilizing an internet browser with high standard levels like WEBKIT is important. The HTML5 and CSS3 are performed with all characteristics and rules through the browser and meanwhile the internet browser must have a good speed in running the JavaScript. A second platform Gecko is used by the internet browser Firefox™. The Gecko platform has a power less than that of WEBKIT. The RIA 403 in the web portal is designed in a specific manner to have the most coordination with WEBKIT first and with the Gecko, presto and trident platforms secondly. The currently available RIA 403 are known as the simple choices in order to simplify several processes like registering or signing up, online shopping, data analysis, data deduction, enhancing application appearance to a high level interface and etc. The RIA 403 provides adorable and interactive experiences for the user and even for organizations. The RIA 403 is also allowed to be used as infrastructures of existing web applications in an organization. Also the small modules of the RIA 403 are utilized in simple HTML pages as desired.

With respect to FIG. 4, the system has an Offline Storage engine 404. The Offline Storage system 404 stores a required application data on the user device 401. The transitional data among different sections of application is stored on the web portal side server to avoid the problems related to the header heavily loaded with application traffic. The Offline Storage engine 404 stores the required data on the user device 401 and the internet browser without affecting the security. The web portal also allows the user to download a PDF copy of any preferred web page to the user device.

With respect to FIG. 4, a Synchronize Cache engine 405 is provided in the system. The Synchronize Cache engine 405 allows the user to review the web based applications in offline. The Offline review enables the user to interact with the web pages even without any internet connectivity. For example, the user is able to access the E-Mails without any need to install a specific software and/or internet connectivity. The web portal allows the user to type the Room address on the browser address bar and access all features without any internet connectivity. A strong cache is used to store and present the most recent information needed by the user.

With respect to FIG. 4, an Orientation Sensor engine 406 system is provided. The web portal utilizes the user device 401 such as computer devices, laptops, especially mobile devices and tablets capability of navigating and accelerometers. When the user is logged in the web portal, the user is able to determine a password through hardware navigation. The mobile web and applications for different operating systems are provided which simplifies the using the social commercial network. The user connecting his/her mobile device makes use of mobile web capability which loads web pages faster and smoother in the application environment.

With respect to FIG. 4, a User Notification system 407 is provided in the system. The web portal uses the User Notification system 407 to provide an effective display in a chat box. The technical importance and strength of the User Notification system 407 lies on the connection provided between the application and web page contents and also on the operating system in which the browser is run. The application is known as notification Application.

With respect to FIG. 4, a File System Access controller 408 is provided to access, download and upload the files and folders on different parts of web portal easily.

With respect to FIG. 4, the web portal provides a Drag and Drop ("D&D") engine 409. The Drag and Drop engine 409 is used for different tasks including a file downloading process from the web portal just by dragging the file and dropping it on the main screen of the user device 401. The uploading to the web portal is done just by dragging a file from the main screen of the user device 401 and dropping it on the web portal.

With respect to FIG. 4, the exact geographical location of user is obtained by a User Locating engine 410. The geographical details include data related to the user country and city. The User Locating engine 410 directs the user to the nearest server based on localization software and geographical details. Many web browsers such as Gecko, WEBKIT, Presto, Trident, etc are used with the User Locating engine 410. The systems and browsers used with of User Locating engine 410 on mobile devices and tablets are Android 2.0+, iPhone 3.0+, Symbian (S60 3rd & 5th generation), etc. The User Locating engine 410 on the web portal is connected to a Content Delivery Network (CDN), to direct the contents towards the user so that the user shares the application content for a specific geographical area with their owners and directs the application content to the friends of same-interest, located in a particular geographical area etc.

According to one embodiment herein, the system further comprises a Simultaneous Server Content system. The Simultaneous Server Content system allows the user to connect the server with a technique called Web socket. The Web socket is a technique used on the web portal for connecting the server to the server through a TCP socket which is capsulated in an HTTP protocol. The web portal uses a model of Push technology and a barrier between network orders and web programming with W3C standards. In the web portal, the web socket provides a connection through a socket on the web portal. The web socket makes a very huge revolution on the web to provide a real time connection.

According to one embodiment herein, a Sound Processing Command mechanism is used. The core technology of the Sound Processing Command mechanism is a component called x-WEBKIT-speech. The x-WEBKIT-speech is an attribute assigned to an input type in HTML environment and displays a microphone type next to the textbox. and connects the user to Google's™ speech server. After processing the voice, the resulting words are displayed in the text box. In the web portal, the user is able to run all commands exist on the web portal by vocal orders/commands using Google™ Chrome™.

According to one embodiment herein, a design pattern Model View Controller (MVC) is provided for the web portal. The MVC software engineering and programming technique is the new technique for increasing the capability of high-level applications in handling different connections and components of the application. The method aims to separate the application components including the parts of data, database, controller and processor pages. The web portal application is very much close to the above method by 85% and makes application run easily without any problem.

According to one embodiment herein, a Synchronized Touch Device is provided. The Synchronize touch device synchronizes the web portal with the computing devices such as touch devices, tablets and handhelds. The programming of web portal for mobile web application is done on very powerful framework named "Sencha Touch". The Sencha Touch framework uses HTML5 and its standards efficiently. In the web portal, the user communicates with one or more users and the main website synchronously through the computing device using a touch technology.

According to one embodiment herein, a semantic structure is used in the web portal. The semantic web is a global space made of machine intellectual computing on which all knowledge bases are matched together semantically and with a capability of comprehending each other. In the web portal, the web pages are created with semantic web structure that is analyzed easily by the search engines. For example: components of html5 used are: <Nav>, <section>, <article>, <aside>, <figcaption>, <menu>, <details>, etc.

According to one embodiment herein, the web portal provides a video conference option to the registered user. The user is allowed to do a video chat and video conference with members or friends. The video chatting component used on the web portal controls a web camera by using Java™ and streaming flash technologies to create a video connection between one or more users. The video chatting component also coordinates with the web socket of the web portal to decrease chatting server traffic significantly. Even a video recording facility is provided in the web portal.

According to one embodiment herein, the web portal works on a cloud computing concept. The Data processing on the web portal is done by a complex cloud computing concept. The user is unaware of the exact geographical location of invitation sender and one or more users answer the invitations.

According to one embodiment herein, the web portal allows the user to synchronize his/her profile with profiles in social networks such as Facebook®, Twitter®, etc for sharing the recent events. The user friends in other social networks are notified of recent user's earning money. Further, synchronizing the profile enables the user to use other social networks for log-in to the online social commercial network.

According to one embodiment herein, the user of the social commercial network use file manager to manage and control all uploaded files and delete or edit cover images, avatar, data shop files, advertisements etc. Each user has a predetermined space to upload files in his/her interest. When more space is needed, the user buys the same from the web portal.

According to one embodiment herein, the online social commercial network provides a shopping page to the registered users. The shopping page is a window for shopping websites such as eBay™, Amazon™, etc through the web portal. The shopping page suggests some products to the user according to the interests/interest. The shopping websites categorize the products and the user purchases the product through his/her account in the online social commercial network. When buying a product, user's friends who have information about that interest/product are suggested to the user in order to do the best shopping. In other words the social commercial network is a mediator between the user and shopping websites. The user finds and purchases a desired product easily. The user is able to save earnings from the web portal and spends the earnings on buying a needed product from shopping websites.

According to one embodiment herein, a method is adopted to expand the use of the social commercial network by plurality of users. For being expanded among people, the web portal invites a second best and third best people in specific interests/interest to join the social commercial network, create assets and asks them to be active. Example: In music interest/interest, a second best and a third best artists are invited to the web portal and after joining the second and third best artists create data including songs, clips, and tutorial videos and send to the fans. In addition to earning money by the artist, the process improves the web portal's credit. After a while and earning money by the artists, the other best artists join the web portal. The artists then inform the fans about respective profile in the web portal, so that the fans also join the web portal and help selling the asset and expanding the social commercial network. After acquiring a large network of users, the web portal requests advertisement agencies to advertise products in related interests/interests and earn lots of money in Rent Minds. Earning money by the users leads to more revenue for the web portal and advertises further among the users. Finally people recommend the web portal to other users resulting in the expansion of the social commercial network.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A computer implemented method for interacting and trading among users of an online social commercial network using a user computing device, the method comprising steps of:

registering a user with a web portal as a subscriber using a computing device, and wherein registering the user includes directly joining the registered user to a preferred group of users with a similar interest, and wherein the similar interest refers to a specific field of user interest;

displaying a user profile to one or more users of similar interests using the computing device;

executing actions using the computing device, and wherein the actions comprise adding user credentials and uploading images relating to a profile of the user;

adding a plurality of assets in the web portal using the computing device, and wherein the plurality of assets includes an intellectual asset and a product;

trading the plurality of added assets through an online social commercial network using the computing device, and wherein trading is performed among one or more users from a preferred interest, and wherein the user performs the trading of the plurality of added assets through a data shop and wherein the data shop is a part of the web portal, and wherein the data shop allows the user for trading the plurality of added assets, and wherein the data shop is provided for sharing and trading the plurality of added assets among the users of same interest or different interest, and wherein the data shop provides a list of most recently shared assets from one or more users and friends of the same interest or of different interest, and wherein a most recently shared asset is shared by an observer, and wherein the observer is a user who follows someone else or monitoring an activity of someone, and wherein the user is able to view a type of the asset, a score of the asset and a name of the observer, and wherein the data shop is provided for searching a desired asset, and wherein the desired asset is shared by one or more users of same or different interests, and wherein the search is conducted based on a type of asset, a subject of the asset, a price of the asset and a score of the asset, and wherein the data shop is provided for sending the asset to one or more users of preferred interest, wherein the asset is sent after providing a plurality of details of the asset and wherein the plurality of details of the asset comprises a brief description of the asset, a sample of the asset, a price of the asset, and interest of the asset, and wherein the data shop is provided for facilitating a discussion within the users of similar interests, and wherein the discussion includes a questionnaire and a poll, and wherein the discussion is initiated by sending an invitation to one or more users of the same interest, and wherein the data shop is provided for receiving a response for the asset, and wherein the response includes an answer, a suggestion, a request to sell and a request to buy, and wherein the user provides scores to the one or more participating users for the response, and wherein the data shop provides a statistical analysis of the traded assets;

transacting the plurality of added assets through the computing device using a currency, and wherein the currency is stored in an online account, and wherein the online account is an online user account for storing transaction related information;

assigning scores by using a computing device to the added and traded assets and a trading subscriber within a group;

creating a team of best users from available users and employing the users selected from a team of best users for executing a task for a period by using the computing device, and wherein the users selected from the team of best users is employed permanently, and wherein the team of best users have a score more than a threshold score value, and wherein the team of the best users are formed automatically by the web portal; and securing user information in the web portal by using a computing device;

wherein the user performs the trading of the asset by the computing device through a rent mind section, wherein the rent mind section is a part of the web portal providing advertisements based service of assets between a plurality of users of an interest, and wherein the user earns money by renting a user's mind through the rent mind section for keeping an advertisement provided from an advertiser user, wherein the user views and responds to the advertisement posted by the advertiser user in the same interest and earns money, wherein the advertiser user creates an advertisement with details comprising an advertisement title, advertisement description, a question, an option for answers, a right option, a cover image, a preferred interest, a reward, a responder's score, a time, a date, a category of responders, and wherein the created advertisement is released in the same interests and is automatically listed in a most recent advertisement list, and wherein the user is provided with two options for managing the advertisement, wherein a first option provides a control to the user for managing the created advertisement details comprising number of responders, balance, advertisement releasing date and the like, and wherein a second option provides the user to review any previously answered question, and wherein a searching system is used for searching a specific advertisement according to the specific interest, and wherein the searching system provides an advanced search which enables the user to find a specific advertisement in a specific time, by a specific reward.

2. The method according to claim 1, wherein the currency is converted into another type of currency through an international bank.

3. The method according to claim 1, wherein registering the user with the web portal comprises:

providing a user name, an E-mail ID, a password and a user preferred interest to the web portal;

providing a preferred name for an online personal webpage, and wherein the online personal page is a user Room, wherein the user is allowed to upgrade the user profile containing more features and facilities, and wherein the user Room provides all recent updates and activities occurring among one or more users of the same interest, and wherein the user uses the defined Room name for self introduction in the online social commercial network and in real world; and verifying details entered by the user and accepting a policy agreement of the web portal.

4. The method according to claim 1, wherein the intellectual asset and the product is any one of thoughts, comments, ideas, drawings, experiences, a ballot question, questionnaires and multimedia content and wherein the multimedia content includes any one of videos, audios, pictures, articles, texts and news.

5. The method according to claim 1 further comprises creating a new interest, when a preferred interest does not exist in the online social commercial network.

6. The method according to claim 1, wherein money stored in an online account is evaluated using an existing international currency as a reference currency and wherein the online account is registered with at least one bank account of the user.

7. The method according to claim 1, wherein executing user actions through the user interface comprises:

inviting friends to join the online social commercial network, and wherein an invitation is sent to friends by importing contacts from a social networking site and E-mail hosting services;

suggesting a list of one or more users of the similar interests;

selecting one or more users from the preferred interest and following an updates of the selected one or more users, and wherein the updates comprises recent activities and traded asset;

managing one or more users from a preferred interest following the updates of the user, and wherein the one or more users following the updates of the user is the observer and wherein the user is an observed user;

adding a description of a different interest in the user profile and wherein adding one or more users from the different interest;

providing one or more web portal related applications;

increasing an online storage space for storing the assets, and wherein the online storage space is increased by sending a request to a website owner, and wherein the request is any one of a free request, a paid request and a gift request;

arranging positions of the various web portal related actions and pinning on a web portal header as desired by the user;

interacting with one or more users of the web portal and wherein interacting with one or more users is performed by a chat box and wherein the chat box is located on a right side of the web portal; and managing a friends list, wherein the friends list includes one or more users with the similar interests and wherein the friends list is categorized in to one or more specific groups indicating a specific interest.

8. The method according to claim 1, wherein step of trading the asset is performed among one or more users of a similar interest, and wherein the trading further comprises earning money by selling the asset to one or more users of same interest, and taking certain percentage of an amount for the traded asset from a buyer and a seller to the social commercial network, and wherein the buyer and the seller are users from the same interest.

9. The method according to claim 1, wherein a step of displaying and exhibiting the user profile to other users comprises:

creating an avatar, and wherein the avatar is an image uploaded or selected by the user;

listing a menu, and wherein the menu comprises different menu options and wherein different menu options include a user profile, exhibiting an idea, managing a friend, sending or receiving an asset and trading of assets;

displaying information of the registered user in a homepage of the online social commercial network and wherein the displayed information comprises information for a last activity, a last shopping, a last evoking (summoning), a last attended and last shared discussion; and displaying the user name and a score along with a list of user interested activities.

10. The method according to claim 1, wherein scoring of the user and the asset is performed through a scoring mechanism to allow trading of an asset, the scoring mechanism comprises:

a series of stars, wherein the stars are five in number, and wherein the user gives a preferred number of stars ranging from one to five for an asset posted by one or more registered users of the online social commercial network; and providing a score for all the assets and the users of the online social commercial network, and wherein the user provides a comment on the asset based on preferred interest.

11. The method according to claim 1, wherein securing the user information comprises:

determining a part of the user profile which is to be displayed to one or more users; and blocking the user from a discussion and trading an asset as a result of an inappropriate conduct of the user.

12. The method according to claim 1, wherein the statistical analysis of the traded asset comprises a scores to the traded asset, a scores to the user and a pictorial chart for the traded asset, and wherein the scores are provided by one or more users within a similar interest, and wherein the scores are provided to the user based on the quality of the traded asset, and wherein the pictorial chart includes a scoring, a liking, and a disliking of the traded asset.

* * * * *